United States Patent
Oumi et al.

(10) Patent No.: US 6,684,676 B2
(45) Date of Patent: Feb. 3, 2004

(54) APPARATUS FOR FORMING OPTICAL APERTURE

(75) Inventors: Manabu Oumi, Chiba (JP); Susumu Ichihara, Chiba (JP); Takashi Niwa, Chiba (JP); Kenji Kato, Chiba (JP); Yoko Shinohara, Chiba (JP); Hidetaka Maeda, Chiba (JP); Nobuyuki Kasama, Chiba (JP); Yasuyuki Mitsuoka, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/997,819

(22) Filed: Nov. 30, 2001

(65) Prior Publication Data
US 2002/0066307 A1 Jun. 6, 2002

(30) Foreign Application Priority Data

| Dec. 1, 2000 | (JP) | ................................. | 2000-367561 |
| Dec. 1, 2000 | (JP) | ................................. | 2000-367563 |
| Dec. 5, 2000 | (JP) | ................................. | 2000-370186 |
| Dec. 7, 2000 | (JP) | ................................. | 2000-373308 |
| Dec. 13, 2000 | (JP) | ................................. | 2000-379264 |
| Dec. 13, 2000 | (JP) | ................................. | 2000-379265 |

(51) Int. Cl.[7] .............................. B21D 28/00; G02B 6/10
(52) U.S. Cl. .............................. 72/325; 72/412; 29/600
(58) Field of Search ..................... 72/325, 324, 340, 72/412, 414; 29/600; 385/129; 359/894

(56) References Cited

U.S. PATENT DOCUMENTS

| 1,468,549 | A |   | 9/1923 | Wootten |
| 2,219,385 | A |   | 10/1940 | Ernst ............................ 287/21 |
| 2,966,873 | A |   | 1/1961 | Hoffman et al. .............. 113/44 |
| 4,684,206 | A |   | 8/1987 | Bednorz et al. ......... 350/96.12 |
| 5,333,495 | A |   | 8/1994 | Yamaguchi et al. .......... 73/105 |
| 5,581,083 | A | * | 12/1996 | Majumdar et al. .......... 250/306 |
| 5,720,988 | A |   | 2/1998 | Yoneda ...................... 425/150 |
| 5,819,579 | A | * | 10/1998 | Roberts ....................... 72/412 |
| 6,046,972 | A | * | 4/2000 | Kuroda et al. .............. 369/126 |
| 6,304,527 | B1 | * | 10/2001 | Ito et al. .................. 369/44.23 |

FOREIGN PATENT DOCUMENTS

| CH | 0176096 | 3/1935 |
| DE | 0849655 | 9/1952 |
| JP | 11265520 | 9/1999 |
| WO | 0028536 | 5/2000 |

* cited by examiner

Primary Examiner—Daniel C. Crane
(74) Attorney, Agent, or Firm—Adams & Wilks

(57) ABSTRACT

An apparatus for producing optical aperture is disclosed. A pressing body has a plane covering a tip and at least a part of stoppers. An opaque film formed on the tip. The pressing body is displaced toward the tip for forming an aperture on a point of the tip. According to the apparatus, the amount of displacement of the plate can be controlled excellently by the stopper and can be made very small. Thus, the aperture having a uniform and small size can be produced on the point of the tip easily.

35 Claims, 27 Drawing Sheets

APPARATUS FOR FORMING OPTICAL APERTURE

BACKGROUND OF THE INVENTION

1. Field of the Invention

The present invention relates to an apparatus for forming an optical aperture. In particular, the present invention relates to an apparatus for forming an optical aperture utilized in a near field device that radiates and/or detects near field light.

2. Description of the Related Art

In order to observe microregions of the sample surface on the order of nanometers, scanning probe microscopes (SPM) such as scanning tunneling microscopes(STM) and atomic force microscopes (AFM) are used. SPM scans a sharpened probe on the sample surface, observes the interaction between the probe and the sample surface such as tunneling current or atomic force, and is able to obtain images with a resolution that depends on the probe tip shape. However, there are relatively severe restrictions on the sample.

Interest has been focused on scanning near field optical microscopes (SNOM) that observe the interaction between the near field generated on the sample surface and the probe, thus enabling the observation of microregions of the sample surface.

In SNOM, near field is irradiated to the sample surface from the aperture formed at the sharpened tip of an optical fiber. The aperture has a size smaller than the diffraction limit of the light introduced into the optical fiber, for example, about 100 nm in diameter. The separation between the aperture formed at the probe tip and the sample is controlled by SPM technology, and is smaller than the aperture size. The spot size of the near field on the sample is approximately the aperture size. Therefore, by scanning the near field that is irradiated on the sample surface, it is possible to observe the optical properties of microregions of the sample.

Not only for microscopes, but also for high density optical data recording is it applicable by introducing light of relatively high intensity through the optical fiber probe towards the sample. Near field with high energy density is generated at the optical fiber probe aperture, and it modifies either the structures or the properties locally of the sample surface. In order to obtain near field of high intensity, efforts have been made to increase the vertical angle.

In these devices utilizing near field, aperture forming is the most important. As one apparatus for forming an aperture, an apparatus disclosed in Japanese Patent Publication No.21201/1993 is known. In the manner of forming the aperture with this apparatus, a pointed light waveguide on which an opaque film is deposited is used as the object for forming the aperture. The method of forming the aperture is that the pointed light waveguide with an opaque film on the point is plastically deformed by pressing the pointed light waveguide against a hard flat plate with a very small amount of pressing, which is well-controlled by a piezoelectric actuator.

Another apparatus for forming an aperture is disclosed in Japanese Patent Laid-Open No. 265520/1999. In the aperture forming apparatus disclosed in Japanese Patent Laid-Open No. 265520/1999, the object which is to have an aperture is the point of a projection which is formed on a plate by FIB(Focused Ion Beam). The method of forming the aperture is that FIB is irradiated on the side of the opaque film on the projection point removing the opaque film on the point.

However, according to the method of Japanese Patent Publication No. 21201/1993, the aperture can be formed on the light waveguide only one by one. Additionally, a piezoelectric actuator having a moving resolution of a few nano meters is needed to control the amount of pressing and thus an aperture forming apparatus has to be placed in an environment which is little influenced by vibration of other devices or air. Furthermore, it takes much time to adjust a waveguide rod to vertically abut on the flat plate. Moreover, in addition to the piezoelectric actuator having a small moving amount, a mechanical translation platform having a large moving amount is needed. Besides, when the pressing amount is controlled by using the piezoelectric actuator having a small moving resolution, a control unit is required and it takes a few minutes to control and form the aperture. Therefore, for aperture formation, a large-scale apparatus such as a high voltage power supply or a feedback circuit is needed. In addition, a problem has arisen that costs for aperture formation are increased.

Additionally, according to the method of Japanese Patent Laid-Open No. 265520/1999, the fabrication object is the projection on the flat plate. However, since the aperture is formed by using the FIB, the time required to form one aperture is as long as ten minutes. Furthermore, because of using the FIB, a sample needs to be placed in vacuum. Thus, a problem has arisen that fabrication costs for aperture fabrication are increased.

SUMMARY OF THE INVENTION

The present invention overcomes the problems of the conventional art. An apparatus for forming an optical aperture comprises an object having a tip of conical or pyramidal shape, a stopper having almost the same height as that of the tip and an opaque film formed on the tip, and loading means for displacing a pressing body having approximately a planar part covering the tip and at least a part of the stopper by a force having a component acting toward the tip to form an aperture on the point of the tip. According to the apparatus for forming an optical aperture in the present invention, the displacement of the planar part of the pressing body is controlled by the stoppers which have almost the same height as that of the tip. Therefore, by simply pushing the planar part with a predetermined force it is easily possible to form an optical aperture. Additionally, it is possible to form an aperture in various environments such as in a vacuum, in a solution, and in the air. Furthermore, it does not require any specially designed controller when it is forming an aperture, resulting in simplification of the aperture forming apparatus. Additionally, it is easy to shorten the duration time of imposing the predetermined force, thus shortening the time for aperture formation and decreasing the cost of aperture formation.

A position controller sets a load target point to a load point of the loader. The load target point is disposed on a surface of the pressing body and over top of the tip. It is possible to control the displacement of the pressing body by a predetermined load toward the load target point. Therefore, optical apertures of uniform and minute size can be easily formed, making it easy to improve the yield of formation of optical apertures.

The apparatus has a plurality of the loaders. The loaders are capable of controlling the load for a plurality of load target points at the same time. The load target points are on a surface of the pressing body and over top of the tips. Since the object for aperture formation comprises plurality of tips and stoppers, it is possible to form an optical aperture on each of the plurality of the tips simultaneously by imposing the predetermined force on all the tips simultaneously. As a result, the fabrication time per an aperture can be shortened considerably, and the cost of aperture formation can be decreased.

A position controller for setting a load target point to a load point of the loader. The load target point being on a surface of the pressing body and over top of the tip. An auto-controller controls the loader and the position controller automatically. An automated control of the loading means and the positioning means results in the decrease in the cost of aperture formation.

Displacement of the pressing body, toward the tip for forming an aperture on a point of the tip, is generated by a weight striking against the pressing body. The apparatus for aperture formation has a simple mechanism in which a weight falls freely, thus lowering the cost of aperture formation.

The displacement of the pressing body, toward the tip for forming an aperture on a point of the tip, is generated by a pressure. The apparatus for aperture formation has a simple mechanism with a pressure means, thus making it possible to form apertures with high precision in a stable manner. Besides, by controlling the pressure generated by the pressure means, the amount of the displacement of the pressing body can be determined arbitrarily, thus making it possible to form apertures of various sizes.

The displacement of the pressing body, toward the tip for forming an aperture on a point of the tip, is generated by a weight striking against the pressing body, and the weight falls freely. A constant impact can be imposed by a free-fall of a weight from a predetermined height. The amount of displacement can be kept constant, thus making it possible to form optical apertures with high precision and low cost.

The displacement of the pressing body, toward the tip for forming an aperture on a point of the tip, is generated by a weight striking against the pressing body. The weight falls freely along the arc from a predetermined angle with respect to a fulcrum axis. The impact caused by the collision between the weight and the object for aperture formation can be kept constant easily, thus making it possible and easy to form optical apertures of uniform and minute size, and improving the production yields of aperture formation. Besides, the amount of displacement of the pressing body can be determined arbitrarily by controlling the position of the fulcrum and the weight, thus making it possible to form apertures of various sizes.

The loader works by a spring force of a pressure spring. By controlling the pressure means with the spring force, it is possible to control the amount of displacement of the pressing body, thus making it possible and easy to form minute optical apertures of uniform size, and improve the production yields of the optical aperture formation. Besides, since the amount of the displacement of the pressing body can be controlled by the spring force, it is easy to form apertures of various sizes.

The loader works by magnets being moved by magnetic repulsive or attractive force. By controlling the pressure means with the magnetic force, it is possible to control the amount of displacement of the pressing body, thus making it possible and easy to form minute optical apertures of uniform size, and improve the production yields of the optical aperture formation. Besides, since the amount of the displacement of the pressing body can be controlled by the spring force, it is easy to form apertures of various sizes.

A work has the object for aperture. A magnifying glass measures amount of the work's curve. A load controller controls a direction of the loader to make the direction being perpendicular to the tip. Even when multiple tips are formed on a substrate, a constant load is applied for individual tip, thus making it possible to form optical apertures in mass production.

A work has the object for aperture, a magnifying glass measuring for amount of the work's curve. An auto-controller controls the position of the work to make a direction of the loader being perpendicular to the tip. A simple mechanism can control the load direction for individual tip, thus making it possible to form optical apertures with high precision. Besides, an automation of the production process is easy, thus making mass production possible. Optical apertures can be supplied with low cost.

The apparatus has a plurality of the pressing bodies. Multiple apertures can be formed at once, thus making it possible to form many apertures quickly, and lowering the production cost of apertures.

A cleaner cleans a surface of the pressing body. When one presser forms apertures repeatedly, an accretion attached on the surface of the presser hinders the aperture formation. In this invention, a cleaning mechanism cleans the surface of the presser, thus making it possible to form apertures continuously in a stable manner.

A presser presses the pressing body. The presser has a spherical shape facing the pressing body. A limited area of the presser receives the force, thus making it easy to deform the presser. Even when the stopper is higher than the tip, it is possible to form apertures.

A presser displaces the pressing body. A surface of the presser that faces the pressing body is made of a material. The material is softer than the pressing body. Even when the surface of the pressing body is not flat, a uniform force can be applied onto the pressing body, thus making it possible to form apertures of uniform size in a stable manner. A presser displaces the pressing body. The pressing body has a groove of inverted pyramid shape. The presser has a shape that can gear with the groove on the pressing body. The pressure area for the presser can be easily defined, thus making it possible to form apertures with high dimension precision in a stable manner.

A work has the object for aperture formation. A stage for being loaded with the work; wherein the work is fixed on the stage. There is no problem of a variation in the aperture sizes when the substrate curves, which would be caused by a variation in the force onto the light guiding body depending on the location on the substrate. Besides, the apparatus has a simple mechanism with vacuum equipment that can be installed easily to the stage. The uninstallation of the substrate is also easy.

BRIEF DESCRIPTION OF THE DRAWINGS

The teachings of the invention can be readily understood by considering the following detailed description in conjunction with the accompanying drawings, in which.

DETAILED DESCRIPTION OF THE PREFERRED EMBODIMENTS

Hereafter, the apparatus for forming the aperture of the invention will be described in detail with reference to the accompanying drawings.

[Embodiment 1]

Figure 1:
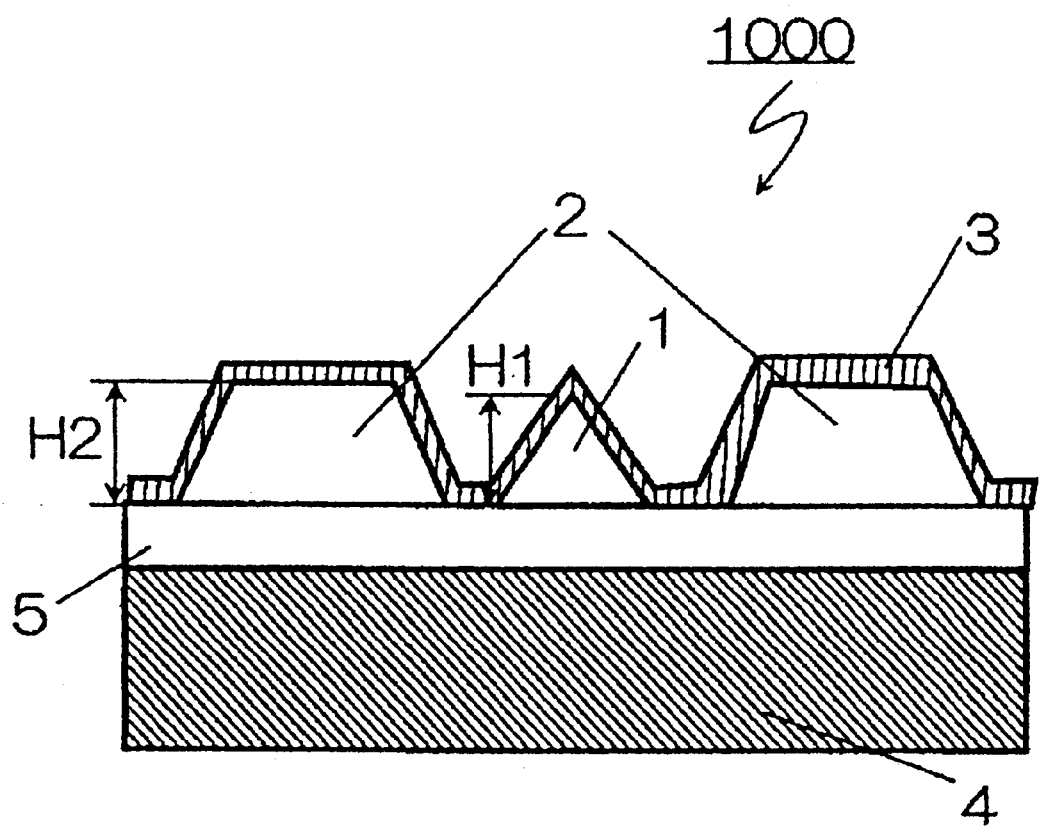
FIG. 1 depicts a diagram illustrating an apparatus for forming the aperture in an embodiment 1 of the invention.

The apparatus for forming the aperture of the invention will be described referring to FIGS. 1 to 3. FIG. 1 is a cross-sectional diagram showing a schematic configuration of the work 1000. As shown in the drawing, the work 1000 comprises a transparent layer 5 formed on a substrate 4, a tip of conical or pyramidal shape 1 and a ridge-shaped stopping member (hereinafter "stopper") 2 formed on the transparent layer 5, and an opaque film 3 formed on the tip 1, the stopper 2 and the transparent layer 5. Additionally, the transparent layer 5 is not necessarily needed here; in that case the opaque film 3 would be formed on the tip 1, the stopper 2 and the substrate 4. Furthermore, the opaque film 3 may be deposited only on the tip 1.

A height H1 of the tip 1 is equal to or under a few millimeters; a height H2 of the stopper 2 is equal to or under a few millimeters. The distance between the tip 1 and the stopper 2 is equal to or under a few millimeters. Besides, a thickness of the opaque film 3 is from a few tens to a few hundreds of nanometers, depending on the materials of the opaque film 3.

For the tip 1, the stopper 2 and the transparent layer 5, a dielectric having high transmissivity in the range of visible light such as $SiO_2$, SiN or diamond, a dielectric having high transmissivity in the range of infrared light such as SeZn or silicon, or a dielectric having high transmissivity in the range of ultraviolet light such as MgF or CaF is used. Additionally, as a material for the tip 1, any material may be preferable that is even a little transparent to an optical wavelength region of a light passing through the aperture. Furthermore, the tip 1, the stopper 2 and the transparent layer 5 may be configured of the same material or different materials. For example, the tip 1 may be configured of silicon oxide, and the stopper 2 may be monocrystal silicon. Moreover, the stopper 2 may be configured of a plurality of materials such as a double-layer structure of monocrystal silicon and silicon oxide. Particularly, the stopper 2 does not need to be transparent to lights. The configuring materials may include a light shielding material such as metals or alloys thereof. Besides, the tip may be configured of various dielectrics, obviously. For the opaque film 3, for example, metals such as aluminum, chromium, gold, platinum, silver, copper, titan, tungsten, nickel, cobalt, and alloys thereof are used. In addition, the substrate 4 may be a transparent material. The tip 1, the stopper 2, the transparent layer 5 and the substrate 4 may be made of the same material.

Figure 2:
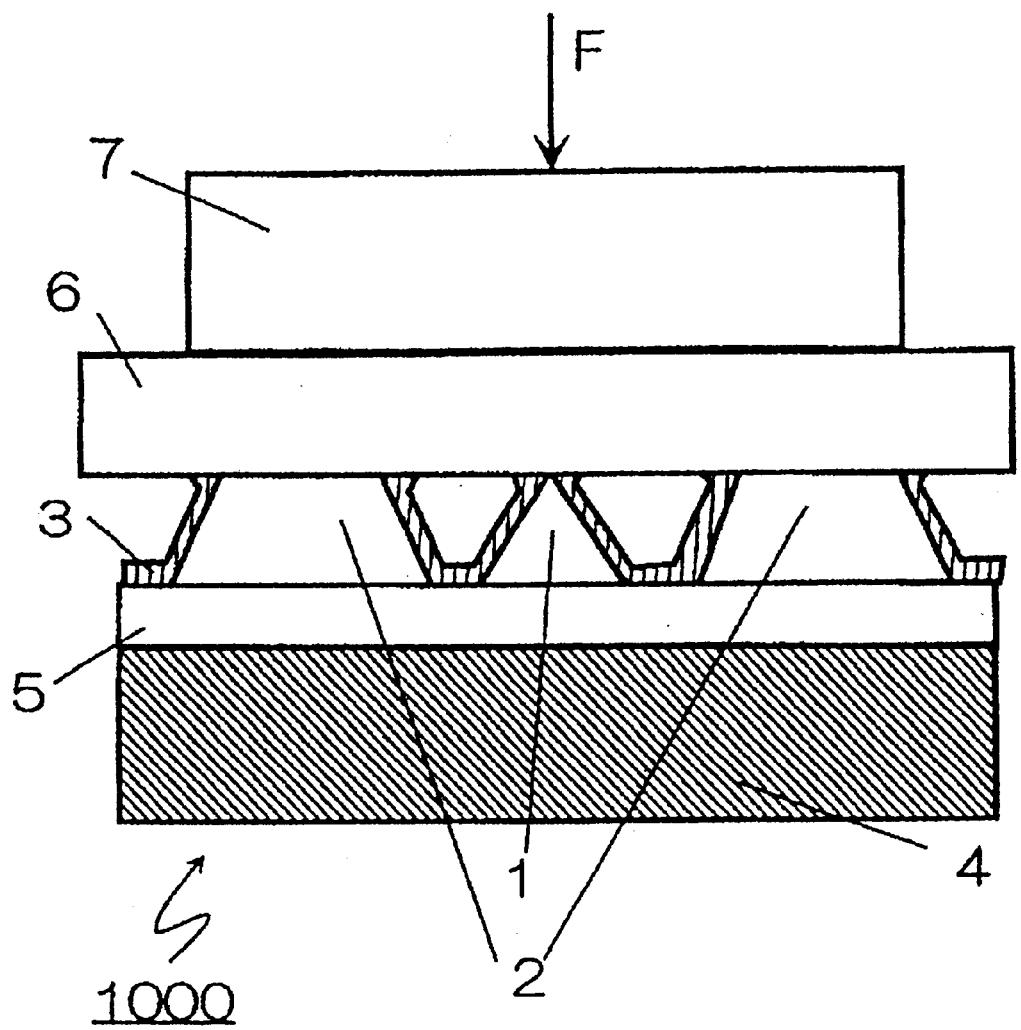
FIG. 2 depicts a diagram illustrating an apparatus for forming the aperture in an embodiment 1 of the invention.

FIG. 2 depicts a diagram illustrating a state in which the opaque film 3 on the tip 1 is being plastically deformed in the apparatus for forming the aperture. A plate 6 is placed on the work 1000 shown in FIG. 1. The plate 6 covers at least a part of the stopper 2 and the tip 1. The plate 6 has a planar portion to come into contact with the tip 1 and the stopper 2. Further, a presser 7 is placed on the plate 6. A loader generates a force F. The force F is applied to the presser 7 in the central axis of the tip 1 and thereby the plate 6 moves toward the tip 1. Compared with a contact area of the tip 1 to the plate 6, a contact area of the stopper 2 to the plate 6 is a few hundreds to a few ten thousands times greater. Therefore, the applied force F is dispersed by the stopper 2 and consequently the displacement of the plate 6 becomes smaller. Since the displacement of the plate 6 is small, the amount of plastic deformation applied to the opaque film 3 is very small. Additionally, the tip 1 and the stopper 2 only receive a very small plastic deformation. One way to apply the force F is such that a weight having a predetermined weight is raised to a predetermined distance for free-fall, or a spring having a predetermined spring constant is mounted on the presser 7 to press the spring for a predetermined distance. As a material for the plate 6, a metal such as Al, Cr, Au and W, a dielectric such as $SiO_2$, SiN and diamond, a semiconductor material such as Si, Ge and GaAs, ceramics materials or a material transparent in the range of visible light is used. Particularly, in the case that the plate 6 is made of a material harder than the opaque film 3 and softer than the tip 1 and the stopper 2, a force that is applied to the tip 1 and the stopper 2 is absorbed by the plate 6, and thus the displacement of the plate 6 becomes smaller. Therefore, the amount of plastic deformation of the opaque film 3 is made smaller easily.

In addition, this embodiment, the structure for applying a load onto the object for aperture forming that consists of a tip 1, a stopper 2, and an opaque film 3 is a plate 6 and a presser 7. However, there may be cases where either a plate 6 or a presser 7 alone can be used to apply load onto the object for forming the aperture. In these cases a structure for applying a load onto the object for aperture forming may be called a pressing device or pressing body.

In addition, the plate 6 may be a transparent plate. In this case, the position of the apex of the tip 1 can be confirmed from above the transparent plate.

Figure 3:
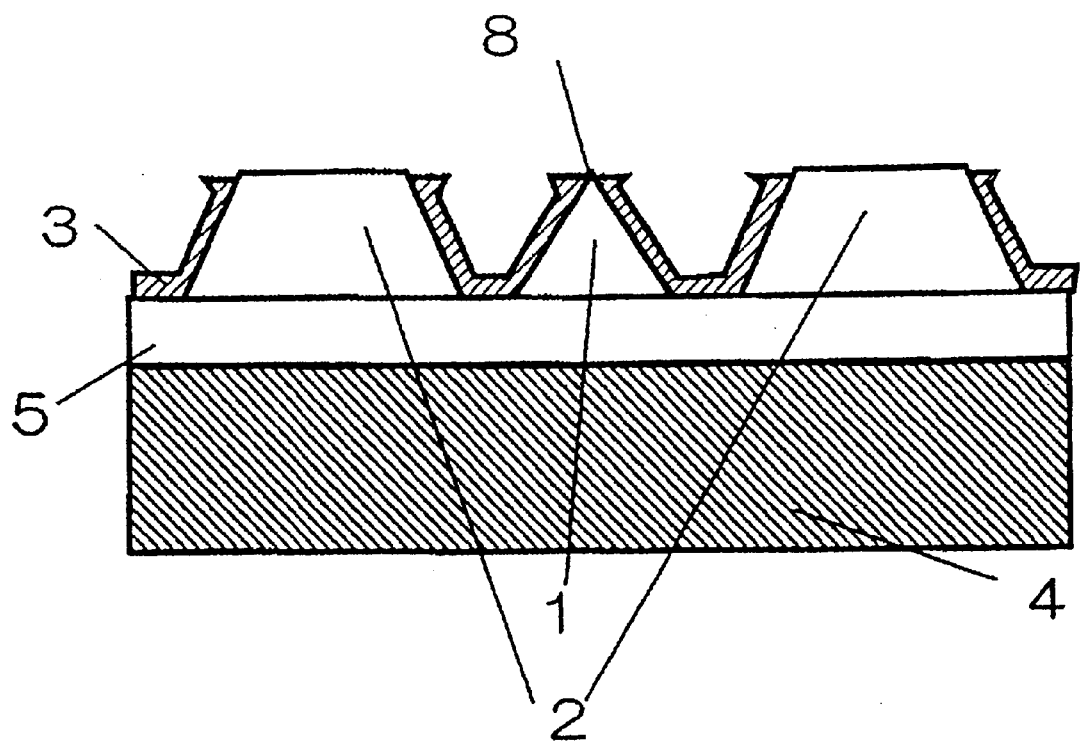
FIG. 3 depicts a diagram illustrating an apparatus for forming the aperture in an embodiment 1 of the invention.

FIG. 3 depicts a state in which the plate 6 and the presser 7 are removed after the force F has been applied. The amount of plastic deformation of the opaque film 3 is very small and the tip 1 and the stopper 2 are deformed only in a plastic deformation region. Therefore, an aperture 8 is formed at the point of the tip 1. The size of the aperture 8 is from about a few nanometers to the extent of the diffraction limit of the optical wavelength of the light passing through the tip 1. Additionally, in the description mentioned above, the plate 6 is inserted between the presser 7 and the work 1000. However, it is needless to say that the plate 6 can be omitted and the work 1000 is directly pressed by the presser 7 to similarly form the aperture 8. In order to enter a light to the aperture 8, the substrate 4 is etched from the side opposite to the side where the tip 1 is formed to expose a transparent layer 5 or at least a part of the tip 1 and thereby an entrance for light to the aperture 8 is formed. Furthermore, it goes without saying that the substrate 4 is configured of a transparent material and thereby a process for forming the entrance for light can be omitted.

As described above, according to the apparatus for producing the aperture of the invention, the amount of displacement of the plate 6 can be controlled excellently by the stopper 2 and can be made very small. Thus, the aperture 8 having a uniform and small size can be produced on the point of the tip 1 easily. Additionally, the near field light can be generated from the aperture 8 by irradiating a light from the substrate side.

Figure 8A:
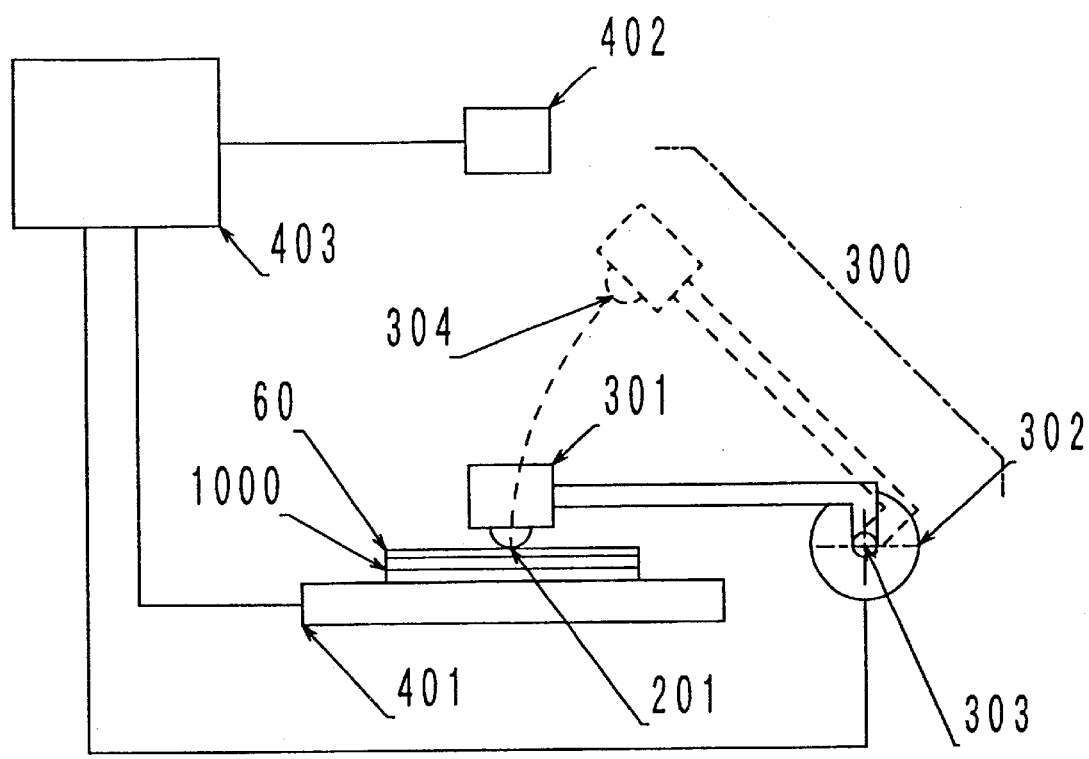
FIGS. 8A and 8B depict diagrams illustrating an apparatus for forming the aperture in an embodiment 2 of the invention.
Figure 8B:
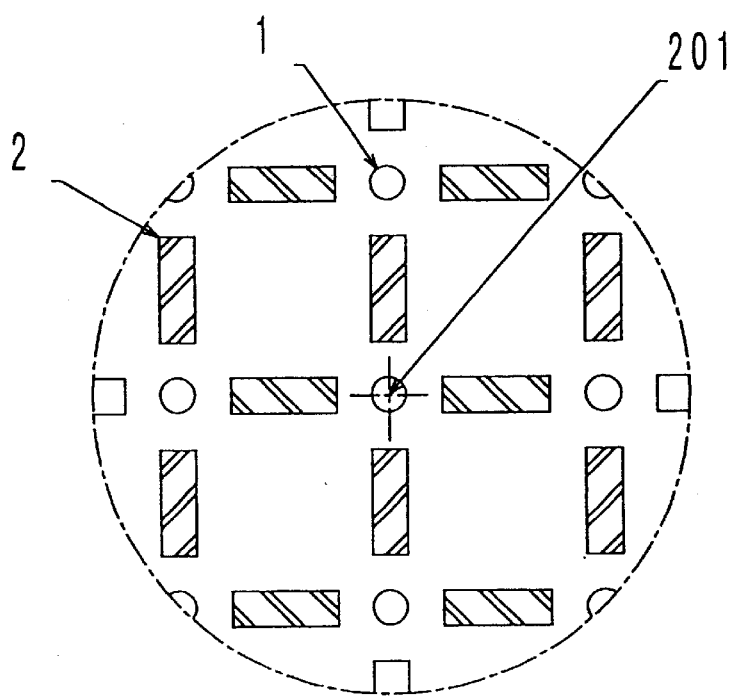

FIGS. 8A and 8B depict the apparatus for forming optical aperture in embodiment 1.

FIG. 8A is the structure diagram of the aperture forming apparatus. FIG. 8B shows the image of the work 1000 and the transparent plate 60 observed from above by the magnifying glass 402.

As shown in FIG. 8A, the apparatus consists of a stage 401, a load controller 300, and a magnifying glass 402. The stage 401 is placed horizontally so that the work 1000 and the transparent plate 60 can be placed parallel in contact with one another. The stage 401 includes a double axis ball screw stage in order to move horizontally in a plane.

The load controller 300 is designed so that the weight 301 falls freely following the arc from a predetermined angle with respect to the fulcrum axis 303 being the fulcrum. The rotation gear 302 consists of clutches and a combination gears. When the rotation gear is rotated in a predetermined direction, the weight 301 is lifted to a predetermined angle. When the rotation gear is further rotated, the weight 301 falls freely.

Furthermore, the stage 401 and the load controller 300 are arranged in such positions that the load point 304 at the tip of the weight 301 applies a load vertically onto a load target point 201 when the weight 301 of the load controller 300 falls. The load target point 201 is on a surface of the transparent plate 60 and over top of the tip.

The magnifying glass 402 consists of a microscope with a cross scale on its optical axis, or a CCD camera. The magnifying glass 402 is located in a relative position to the fulcrum axis 303 so that the load point 304 should be on the center of the cross scale.

After the work 1000 is placed on the stage 401, the stage 401 is moved by a position controller so that the load target point 201 should be on the cross scale of the magnifying glass 402. Next, by rotating the rotation gear 302 of the load controller 300, the weight 301 falls freely from a predetermined angle, applying a predetermined load onto the load target point 201. Thus an optical aperture formed on the tip 1 on the work 1000.

The force F onto the load target point 201 depends on the angle and the weight of the weight 301 of the load controller 300. The force F is determined by the aperture size, the material of the plate 6, and the thickness and the material of the opaque film 3. The tip of the weight 301 has a spherical shape so that the load point area for the load target point 201 becomes as small as possible.

As described above, according to the aperture forming apparatus in this invention, it is possible to apply a constant load onto the load target point with high precision, thus making it possible to form optical apertures in a stable manner. Furthermore, the cost of the whole apparatus is low, making it possible to form optical apertures with low cost.

Furthermore, there may be a plurality of loaders that are capable of controlling the load for a plurality of load target points simultaneously. In such a case, since the object for aperture forming consists of a plurality of tips and stoppers, it is possible to form optical apertures on a plurality of tips at once by applying the force in the block, thus shortening the fabrication time per aperture, and lowering the production cost of optical apertures.

Figure 4A:
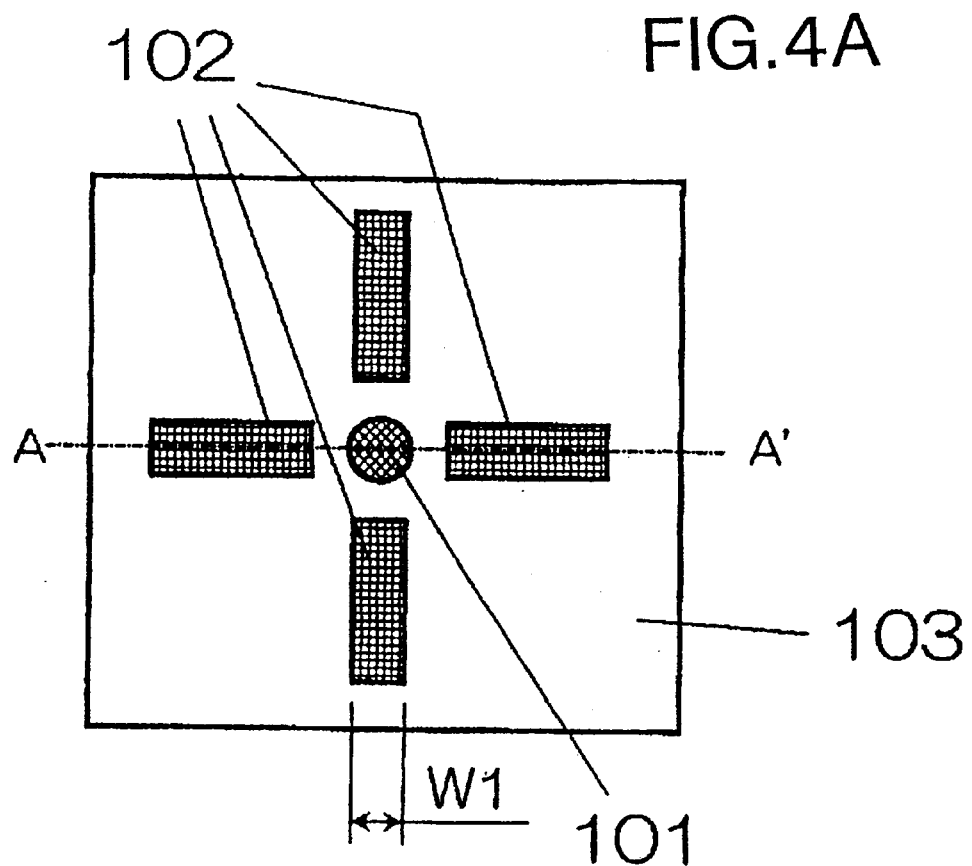
FIGS. 4A and 4B depict diagrams illustrating a method for fabricating a work 1000.
Figure 4B:
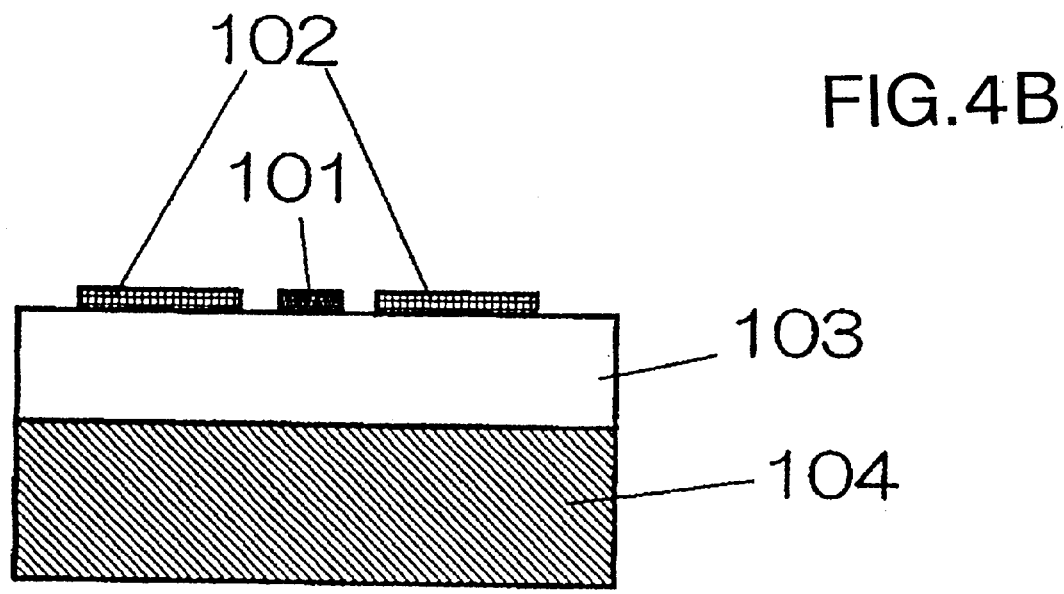

Next, a method for fabricating the work 1000 will be described referring to FIGS. 4A, 4B, 5A and 5B. FIGS. 4A and 4B illustrate a state in which the transparent material 103 is formed on a substrate material 104 and then a tip mask 101 and a stopper mask 102 are formed. FIG. 4A depicts a top view and FIG. 4B depicts a cross-sectional view at a position shown by A-A' of FIG. 4A. The transparent material 103 is formed on the substrate material 104 by the chemical vapor deposition (CVD), the physical vapor deposition (PVD) or the spin coating. Additionally, the transparent material 103 can be formed on the substrate material 104 by the solid state bonding or gluing as well. Then, the tip mask 101 and the stopper mask 102 are formed on the transparent material 103 by the photolithography process. The tip mask 101 and the stopper mask 102 may be formed simultaneously or separately.

For the tip mask 101 and the stopper mask 102, a photo-resist or a nitride film is generally used. These may be selected properly in accordance with a material of the transparent material 103 and an etchant to be used in the subsequent process. For the transparent material 103, a dielectric having high transmissivity in the range of visible light such as $SiO_2$ or diamond, a dielectric having high transmissivity in the range of infrared light such as SeZn or Si, or a dielectric having high transmissivity in the range of ultraviolet light such as MgF or CaF is used.

A diameter of the tip mask 101 is a few millimeters, for example. A width W1 of the stopper mask 102 is equal to the diameter of the tip mask 101 or a few tens nanometers to a few micrometers smaller than that. Additionally, the width W1 of the stopper mask 102 may be from a few tens nanometers to a few micrometers greater than the diameter of the tip mask 101. Furthermore, a length of the stopper mask 102 is not less than a few tens micrometers.

Figure 5A:
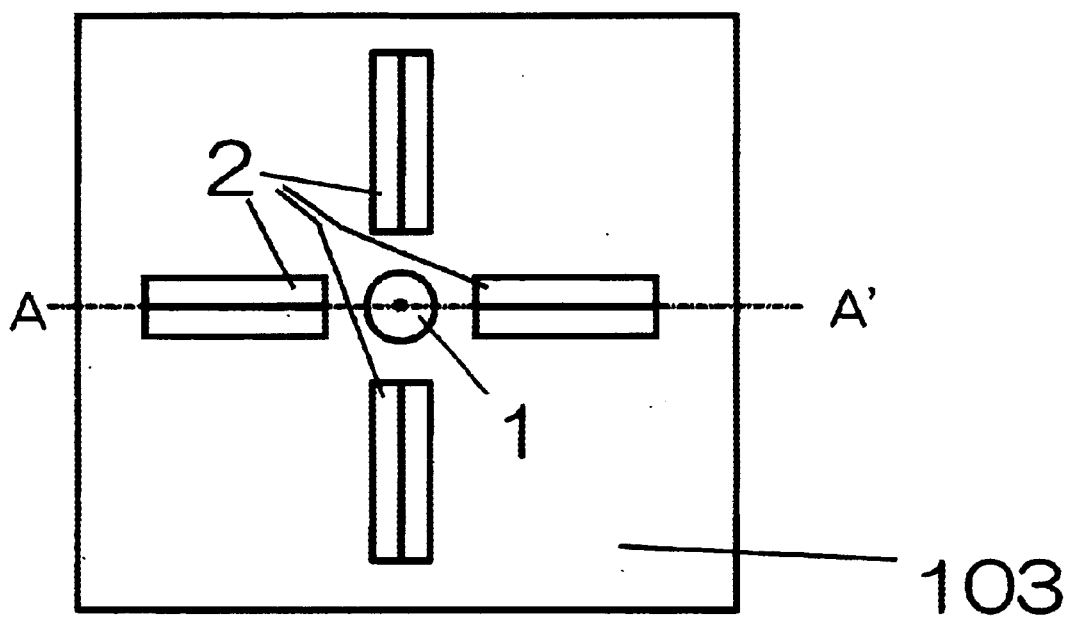
FIGS. 5A and 5B depict diagrams illustrating the method for fabricating the work 1000.
Figure 5B:
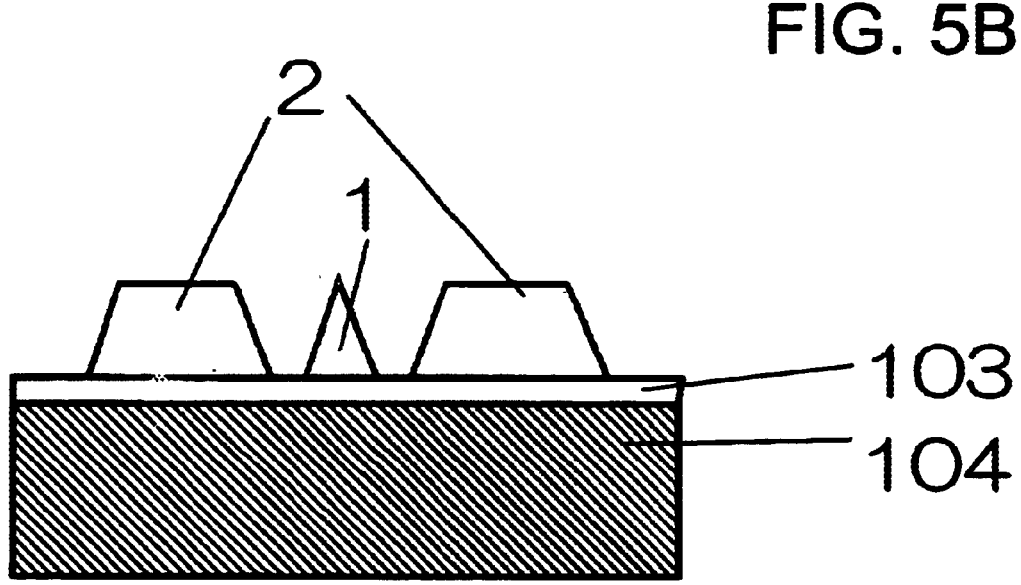

FIGS. 5A and 5B illustrate a state in which the tip 1 and a plurality of stoppers 2 have been formed. FIG. 5A is a top view and FIG. 5B is a cross-sectional view at a position shown by A-A' in FIG. 5A. After the tip mask 101 and the stopper mask 102 are formed, the tip 1 and the stoppers 2 are formed by the isotopic etching in wet etching. Adjusting the relationship among a thickness of the transparent material 103 and the heights of the tip 1 and the stoppers 2 may form or not form the transparent layer 5 shown in FIG. 1. A diameter of the point of the tip 1 is from a few nanometers to a few hundreds nanometers. After that, the opaque film is deposited by sputtering or vacuum evaporation and thereby the work 1000 shown in FIG. 1 can be formed. Additionally, in the case that the opaque film 3 is deposited only on the tip 1, a metal mask having a topology to deposit the opaque film on the tip 1 is placed to perform sputtering or vacuum evaporation in the deposition process of the opaque film 3. Furthermore, it is needless to say that after the opaque film 3 is deposited on the entire surface where the tip of the work 1000 has been formed, using the photolithography process in which the opaque film 3 remains only on the tip 1 can form the opaque film 3 only on the tip 1.

Figure 6:
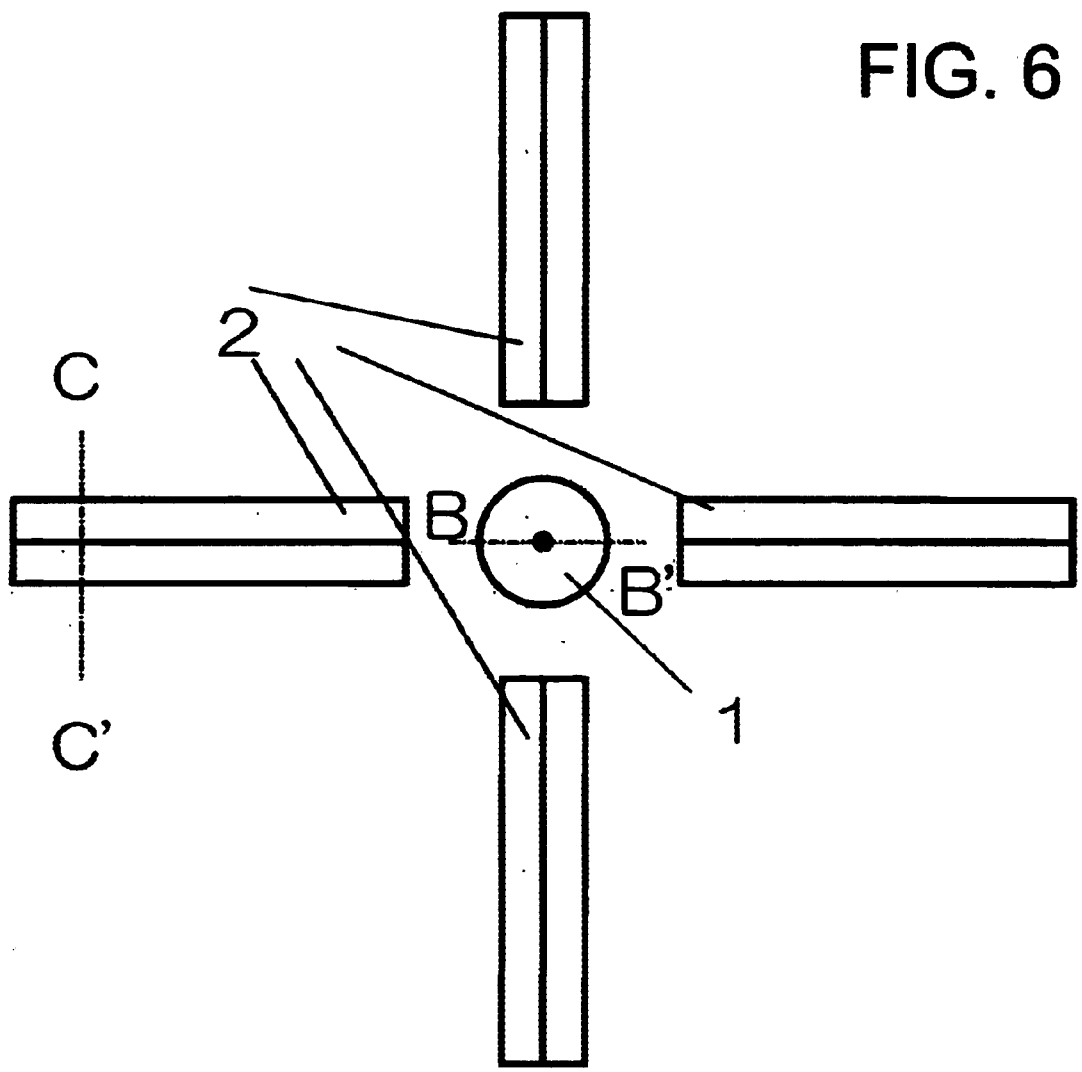
FIG. 6 depicts diagrams illustrating a relationship between the heights of the tip 1 and the stopper 2 in the method for fabricating the work 1000.
Figure 7A:
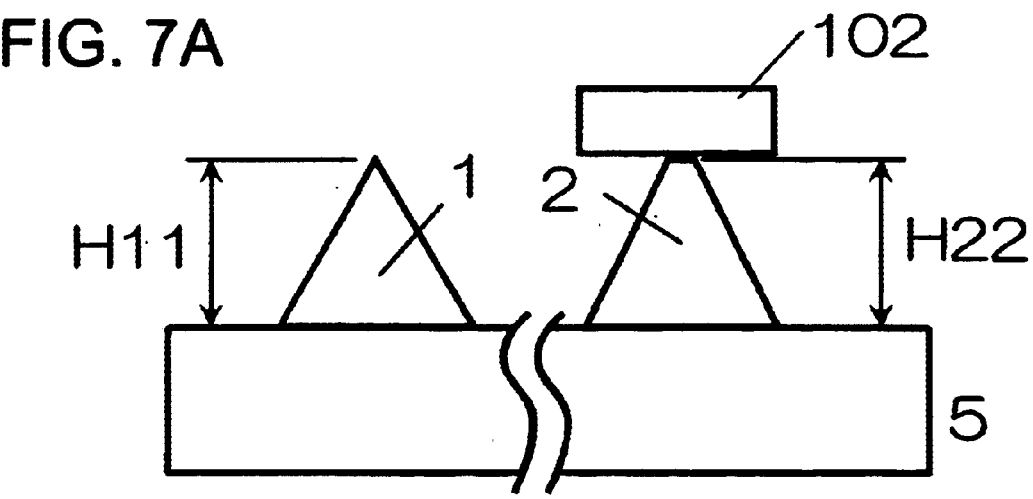
FIGS. 7A to 7C depict diagrams illustrating a relationship between the heights of the tip 1 and the stopper 2 in the method for fabricating the work 1000.
Figure 7B:
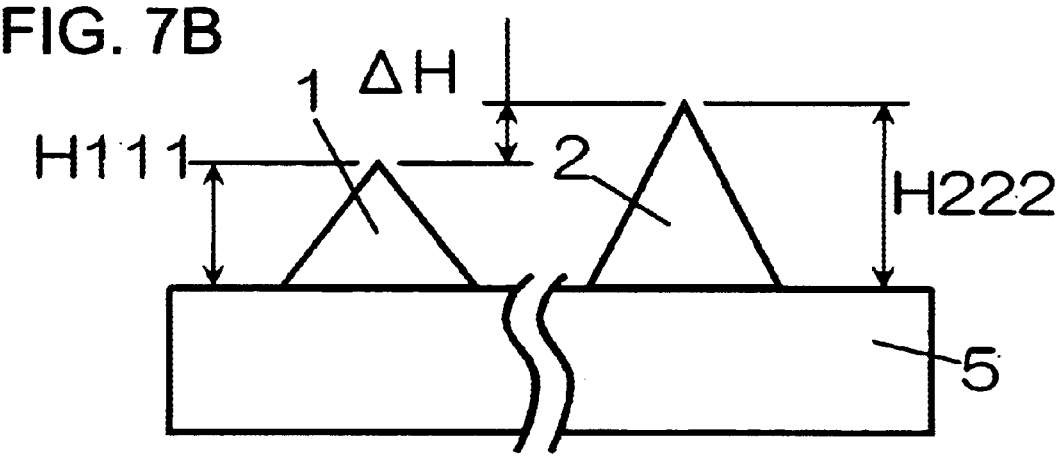
Figure 7C:
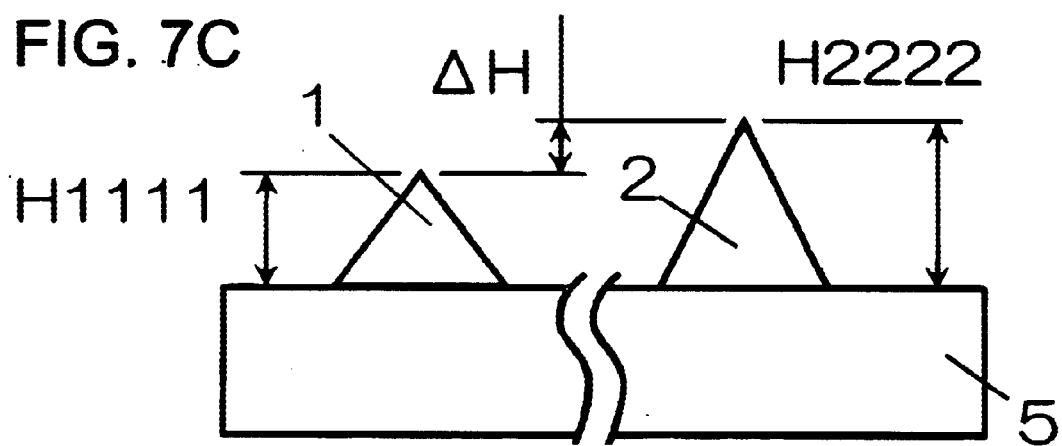

FIGS. 6, 7A, 7B and 7C are diagrams illustrating the relationship between the heights of the tip 1 and the stopper 2 in the method for fabricating the work 1000 as described above. In addition, hereafter, only the case in which the diameter of the tip mask 101 is smaller than the width of the stopper mask 102 will be described. FIG. 6 is a diagram illustrating only the tip 1 and the stopper 2 in the process described in FIG. 5A. FIGS. 7A to 7C are cross-sectional views illustrating the tip 1 at a position shown by B-B' in FIG. 6 and the stopper 2 at a position shown by C-C' in the FIG. 6.

FIG. 7A is a diagram illustrating a state in which the tip 1 has been formed. The width of the stopper mask 102 is greater than the diameter of the tip mask 101. Thus, a flat portion is left on the top of the stopper 2 and the stopper mask 102 is left on this flat portion in the state of FIG. 7A. However, the tip mask 101 has a very small contact area to the tip 1 and therefore it comes off. In the state of FIG. 7A, a height H11 of the tip 1 is the same as a height H22 of the stopper 2.

FIG. 7B illustrates a state in which further proceeding etching from the state of FIG. 7A, the flat portion on the top of the stopper 2 is just removed. When etching is performed from the state of FIG. 7A, a height H111 of the tip 1 having no tip mask 101 is lowered gradually, whereas a height H222 of the stopper 2 remains the same as the height H22. A width of the flat portion of the top of the stopper 2 becomes narrower gradually and its cross-sectional shape becomes triangular as shown in FIG. 7B. A difference ΔH between the heights of the tip 1 and the stopper 2 at this time is about 1000 nm or under, varying according to the difference between the diameter of the tip mask 101 and the width of the stopper mask 102 and a point angle between the tip 1 and the stopper 2.

FIG. 7C illustrates a state in which etching further proceeds from the state of FIG. 7B. A height H1111 of the tip 1 becomes lower than the H111. Similarly, a height H2222 of the stopper 2 also becomes lower than the height H222. However, a reduced amount of the height H1111 is equal to that of H2222 and thus the difference ΔH between the heights of the tip 1 and the stopper 2 does not change. Additionally, in the case that the width of the stopper mask 102 is smaller than the tip mask 101, the relationship between the heights of the tip 1 and the stopper 2 is only reverse. Furthermore, in the case that the tip mask 101 is equal to the stopper mask 102, it is needless to say that the height of the tip 1 becomes equal to that of the stopper 2.

According to the method for fabricating the work 1000 of the invention, the difference ΔH between the heights of the tip 1 and the stopper 2 can be controlled excellently by the photolithography process. Therefore, in the method for producing the aperture described in FIGS. 1 to 3, the displacement of the plate 6 can be controlled excellently.

As described above, according to the embodiment 1 of the invention, the heights of the tip 1 and the stopper 2 can be controlled excellently and disposing the stopper 2 can make the displacement of the plate 6 smaller. Therefore, the aperture 8 having a uniform and minute size can be formed on the point of the tip 1 easily without using an actuator having high resolution. Our experiment shows that the aperture 8 having a diameter of 100 nm or under could be formed by only tapping the presser 7 with a hammer in hand. Additionally, the heights of the tip 1 and the stopper 2 are controlled excellently and thus the production yields of the aperture 8 were improved. Furthermore, the work 1000 described in the embodiment 1 can be fabricated by the photolithography process. Thus, multiple works can be fabricated on a sample having a large area such as a wafer. The force F is held constant and thereby the apertures 8 having a uniform aperture diameter can be formed on the respective works 1000. Moreover, changing the force F is extremely simple so that the apertures 8 having a different aperture diameter can be formed separately on the multiple works 1000 that have been fabricated. Besides, simply applying the force F forms the aperture 8 and thus the time to produce the aperture is as short as from a few seconds to a few tens seconds. In addition, according to the embodiment 1 of the invention, any fabrication environment is acceptable.

Therefore, fabrication in the atmosphere is possible and fabrication states can be observed by an optical microscope instantly. Additionally, fabrication in a scanning electron microscope makes it possible to observe fabrication states with higher resolution than the optical microscope. Furthermore, by fabrication in a liquid, the liquid serves as a damper and thus fabrication conditions of improved controllability can be obtained.

Moreover, the force F is applied to the sample fabricated with a plurality of the works 1000 in the block and thereby the apertures 8 having a uniform aperture diameter can be produced at one time as well. In the case of fabrication in the block, the fabrication time per aperture becomes as short as a few hundreds milliseconds or under, depending on the number of the works 1000 per wafer.

[Embodiment 2]

The apparatus for forming optical aperture in embodiment 2 of the invention is described referring to FIGS. 8A and 8B.

FIG. 8A depicts the diagram of the aperture forming apparatus. FIG. 8B shows an obtained image of the work 1000 and the transparent plate 60 observed from above by the magnifying glass 402.

A detailed description of the portion that is identical to embodiment 1 is omitted.

The rotation gear 302 of the load controller 300 comprises a rotation motor, clutches, and combination gears. The rotation motor is able to control the rotation angle, and it can be, for example, a combination of a stepping motor, DC motor, and an angle sensor. The magnifying glass 402 uses a CCD camera. The stage 401 is an XY stage with an interface such as GPIB. The load controller is controlled by the auto-controller 403.

The auto-controller 403 can be a personal computer. It receives image data from the magnifying glass 402, adjusts the load target point 201 to the load point 304, and then rotates the motor of the rotation gear 302 so that the weight 301 falls freely. The auto-controller 403 is programmed so that the above described operations can be done sequentially.

As described above, according to the apparatus for forming optical aperture in the present invention, it is possible to impose a constant load onto the load target point repeatedly with high precision. It is made possible by this invention to form optical aperture in a stable manner. Furthermore, the cost of the apparatus is low leading to low cost production of optical apertures.

It is also possible to form sequentially an optical aperture on a plurality of the object for aperture formation on the work 1000. Mass production of optical apertures is possible with low cost.

[Embodiment 3]

Figure 9A:
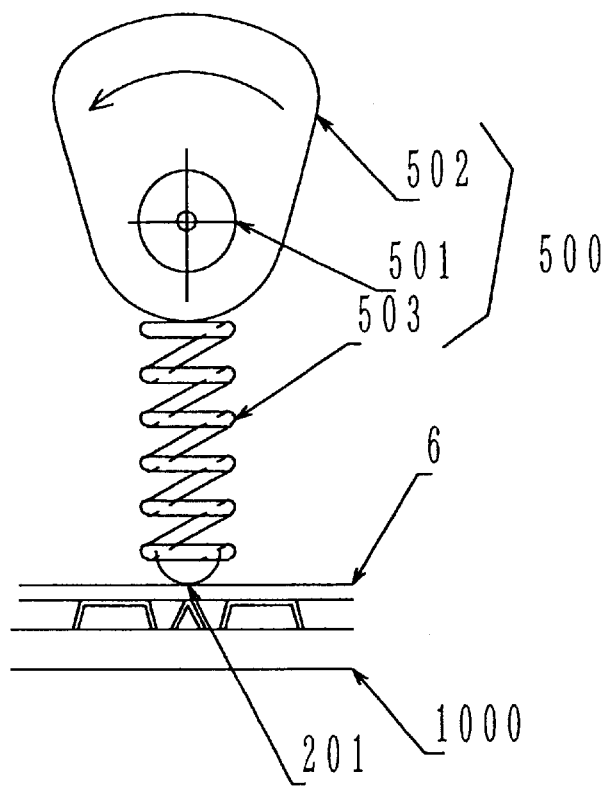
FIGS. 9A and 9B depict diagrams illustrating an apparatus for forming the aperture in an embodiment 3 of the invention.
Figure 9B:
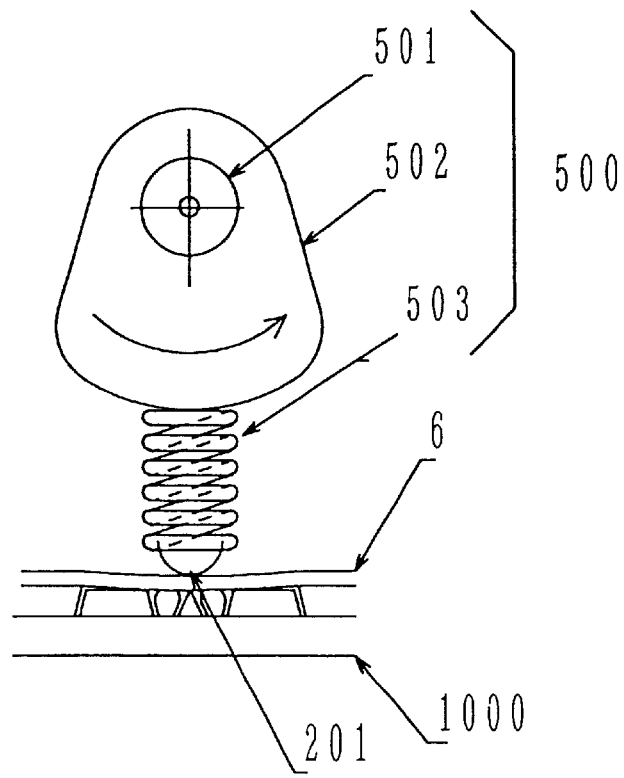

FIGS. 9A and 9B depict the apparatus for forming optical aperture in embodiment 3. FIG. 9A shows the details of the load controller of the apparatus. FIG. 9B shows that load is being imposed on the plate 6 by the load controller.

Description of the parts that are common to embodiment 1 or 2 is omitted.

The rotation gear 502 of the load controller 500 consists of the rotation motor 501, clutches, and combination gears. The rotation gear 501 is able to control the rotation angle. The rotation gear 501 can be a combination of, for example, a stepping motor, a DC motor, and an angle sensor. When the rotation gear 502 is rotated in the direction indicated as an arrow in FIGS. 9a and 9B, the pressure spring 503 is pushed. A constant pressure is imposed on the load target point 201 by both the shape of the rotation gear 502 and the rotation speed of the rotation motor 501. The load on the load target point 201 depends on the shape of the rotation gear 502 and the spring force of the pressure spring 503. This load is determined by the material of the plate 6, the thickness of the opaque film 3, and the material of the opaque film 3. The tip of the pressure spring 503 has a spherical shape so that the load point area for the load target point becomes as small as possible.

By controlling the rotation speed of the rotation motor 501, it is easy to control the load on the load target point, thus it is easy to obtain an aperture of arbitrary size.

[Embodiment 4]

Figure 10A:
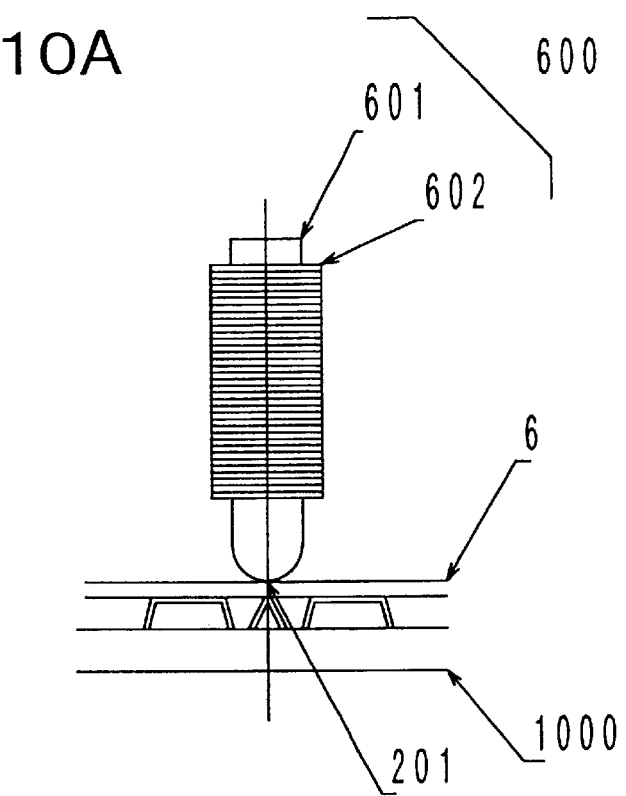
FIGS. 10A and 10B depict diagrams illustrating an apparatus for forming the aperture in an embodiment 4 of the invention.
Figure 10B:
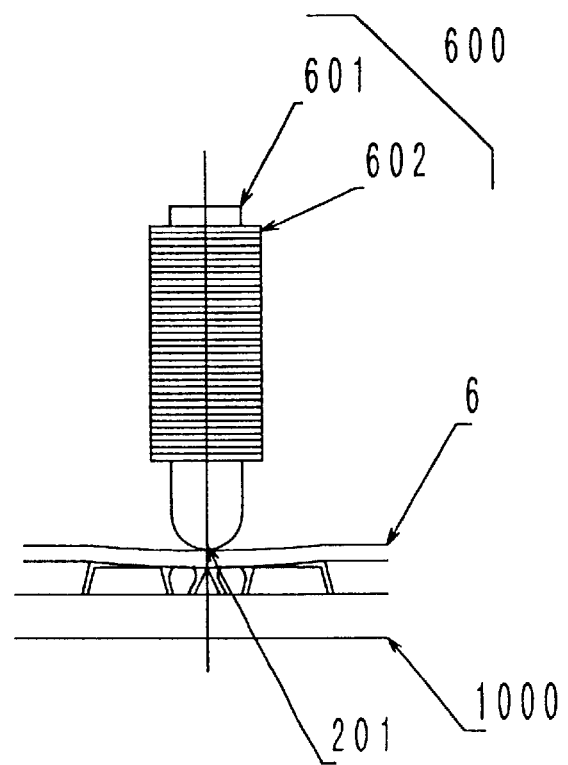

FIGS. 10A and 10B depict the apparatus for forming optical aperture in embodiment 4. FIG. 10A shows the details of the load controller of the apparatus. FIG. 10B shows that load is being imposed on the plate 6 by the load controller.

Description of the parts that are common to embodiment 1, 2, or 3 is omitted.

The load controller 600 comprises a coil 602 and a magnetized iron core 601. The electric current direction in the coil 602 moves the iron core 601 vertically. The plate 6 that acts as a pressing body has the load target point 201. A constant load can be imposed on the load target point 201 resulting in formation of optical aperture on the tip 1 on the work 1000. The load on the load target point depends on the electric current inside the coil 602. This load is determined by the aperture size, the material of the plate 6, the material of the opaque film 3, and the thickness of the opaque film 3. The tip of the iron core 601 has a spherical shape so that the load point area for the load target point 201 becomes as small as possible. By controlling the electric current and the duration time, it is possible to control the load on the load target point, and thus easy to obtain an aperture of arbitrary size.

Furthermore, since it can be controlled electrically, a personal computer can be used to control, thus automation is easy, and mass production is possible. Aperture formation is made inexpensive.

[Embodiment 5]

Figure 11A:
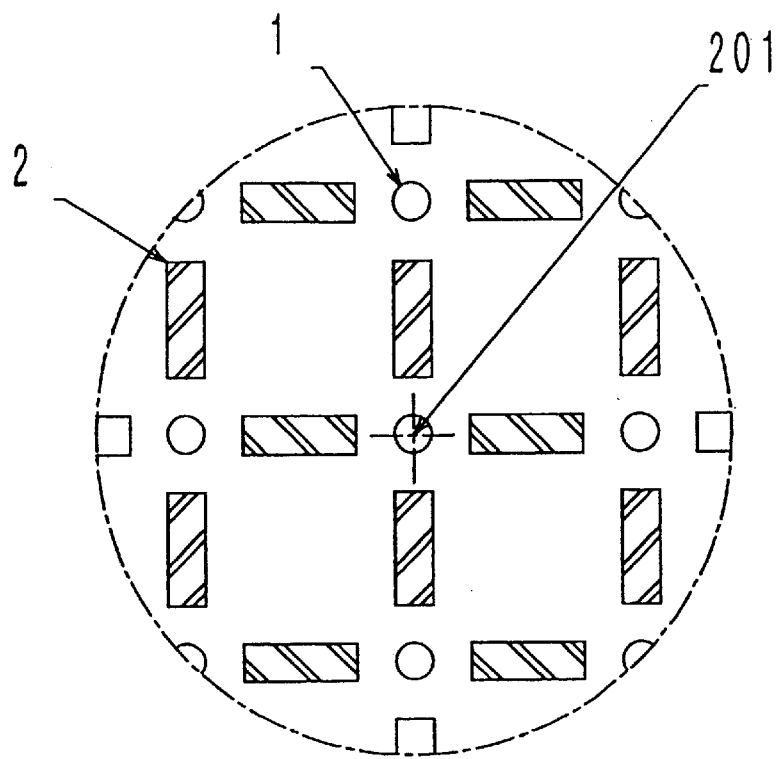
FIGS. 11A and 11B depict an image observed with the magnifying glass above the work 1000, and an image obtained by converting the image into a binary image in an embodiment 5 of the invention.
Figure 11B:
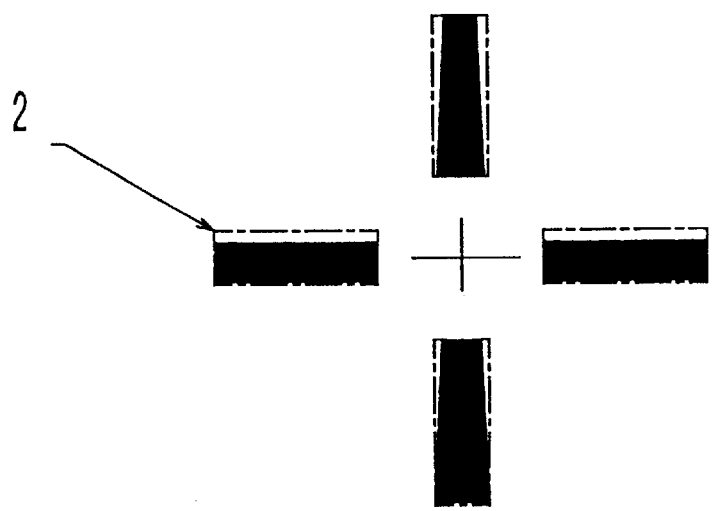

In embodiment 5, the same structure as in FIG. 8A in embodiment 2 is used. FIG. 11A shows the image of the work 1000 and the transparent plate 60 observed from above by the magnifying glass 402. FIG. 11B shows the image which is obtained by converting the image in FIG. 11A into binary format. The conversion is made by the auto-controller 403. In FIG. 8A The horizontally placed stage 401 has a structure such that the work 1000 and the transparent plate 60 can be placed in parallel. The work 1000 and the transparent plate 60 are in contact. The stage 401 comprises a double axis (xy) stage (not shown), and a double axis goniostage (not shown). The xy stage locates the load point of the load controller 300 onto the load target point 201 for each of the tips on the work 1000. The goniostage adjusts the inclination of the work that is caused by the curve or the variation in the film thickness.

For the xy stage, a conventional stage of planar motion type such as ball screw type is used. For the goniostage, a conventional stage is combined with the xy stage.

The load controller 300 is designed such that the weight 301 falls freely along the arc from a predetermined angle with respect to the fulcrum axis 303. The rotation gear 302 consists of clutches and a combination gears. When the rotation gear 302 is rotated in a particular direction, the weight 301 is lifted to a predetermined angle. When the rotation gear 302 is further rotated, the weight 301 falls freely. The stage 401 and the load controller 300 are placed so that when the weight 301 of the load controller 300 has fallen on the load target point, the load is imposed vertically by the load point 304 located at the tip of the weight 301 onto the load target point.

FIG. 11A shows the image obtained by the magnifying glass 402. The microscope of which the optical axis has a cross scale is combined with a CCD camera. The image data obtained by the CCD camera is transferred to the auto-controller 403.

The auto-controller 403 includes a microcomputer, an interface such as GPIB. A personal computer with an interface for image input from the CCD camera is used.

The auto-controller 403 controls the location of the tip based on the image data from the CCD camera. FIG. 11B shows the result of binarization of the image from the CCD camera.

The dotted line shows the lineament that would be shown if the work 1000 were horizontal. In FIG. 11B, it is seen that the work 1000 is inclined vertically. It should be adjusted to be horizontal by the goniostage of the stage 401.

In this embodiment it is possible to impose a constant load vertically onto the tip of the plurality of the tips on the work 1000, resulting in precise formation of apertures.

It is also possible to measure the inclination of all the tips and the stoppers on the work 1000 before forming the apertures, store the inclination in the auto-controller 403 before forming the apertures continuously.

In this embodiment, a combination of a CCD camera and an image processing is used to measure the inclination that is caused by the curve of the work 1000 and the variation of the film thickness. The same measurement can also be performed by a three-dimensional topology measurement device based on a known method of light interference.

In addition, the load controller 300 may control a direction of the loader to make the direction being perpendicular to the tip.

As described above, according to the apparatus for aperture forming in this invention, it is possible to form an optical aperture in a stable manner, because a constant load with high precision can be applied onto the load target point repeatedly. Additionally, the cost of the whole apparatus is low, which makes it possible to form an optical aperture with low cost. Furthermore, the structure of the apparatus is so simple that an automation of the aperture forming process is possible, and a mass production becomes possible.

[Embodiment 6]

Figure 12A:
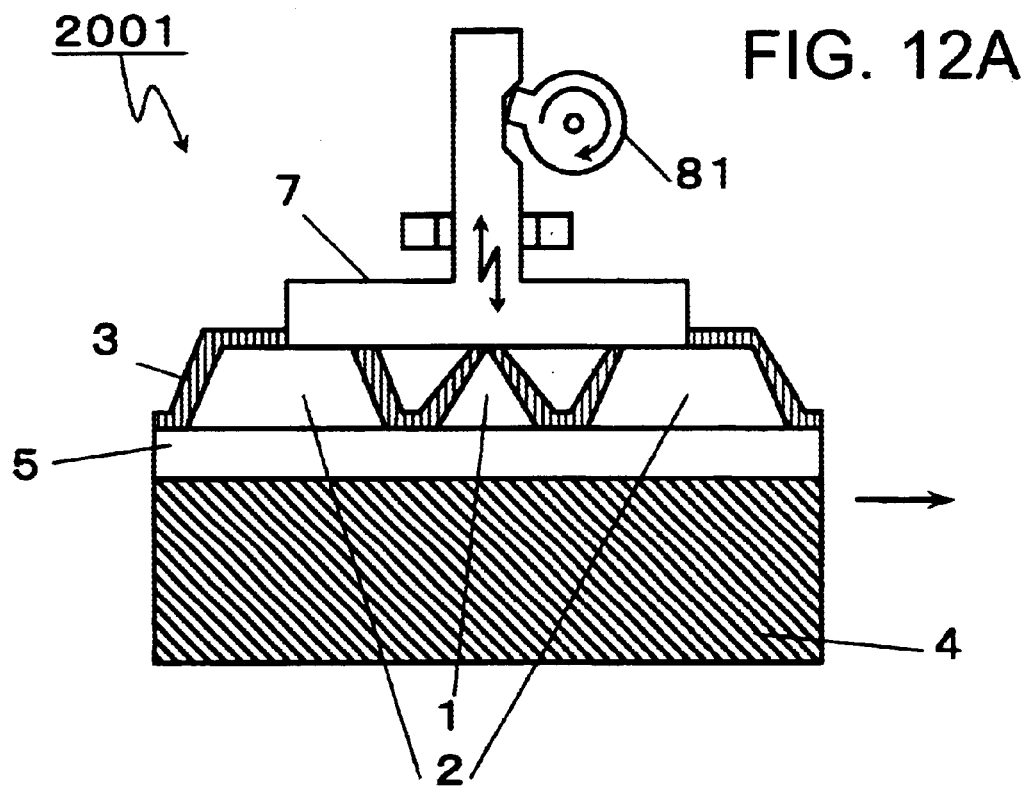
FIGS. 12A and 12B depict diagrams illustrating an apparatus for forming the aperture in an embodiment 6 of the invention.
Figure 12B:
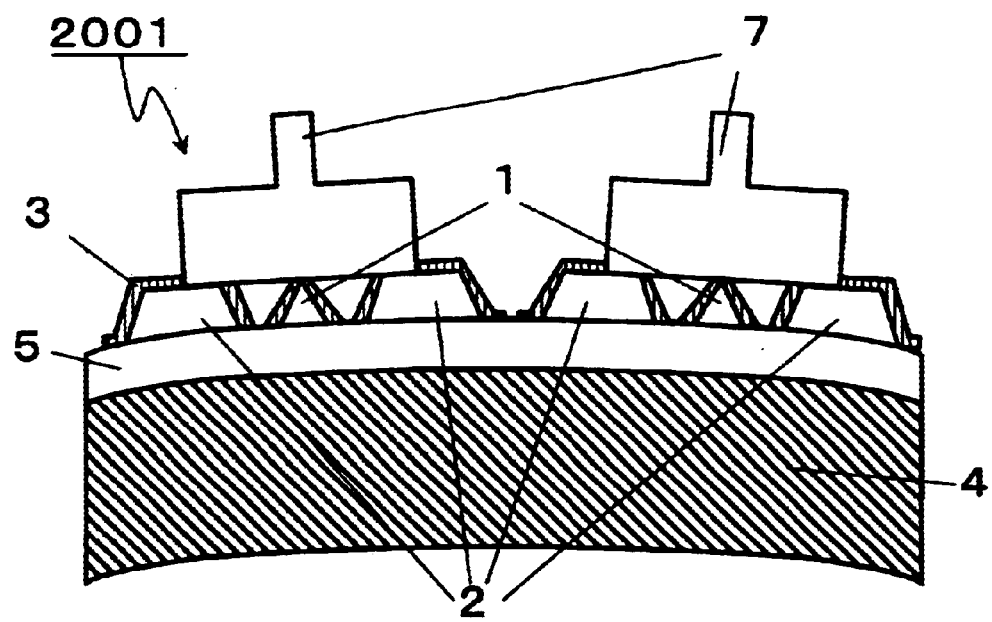
Figure 13:
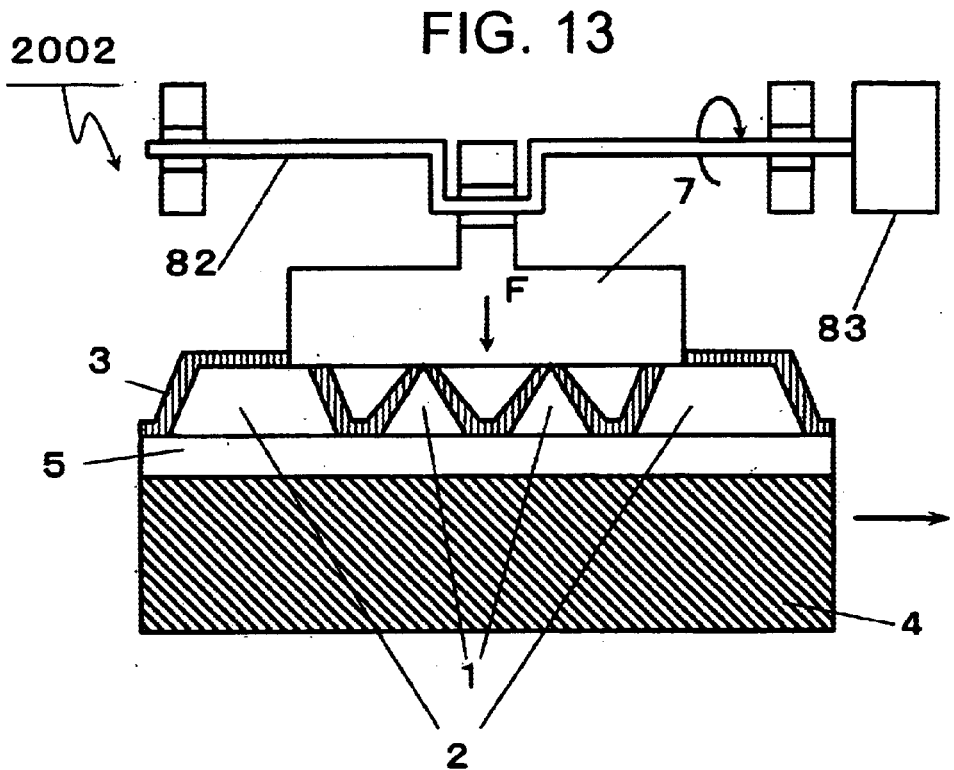
FIG. 13 depicts a diagram illustrating an apparatus for forming the aperture in an embodiment 6 of the invention.

FIGS. 12A, 12B and 13 depict the apparatus for forming optical apertures in embodiment 6. As shown in the drawing, the work 2001 comprises a transparent layer 5 formed on a substrate 4, a tip of conical or pyramidal shape 1 and a ridge-shaped stopper 2 formed on the transparent layer 5, and an opaque film 3 formed on the tip 1, the stopper 2 and the transparent layer 5. A presser 7 is placed above the tip 1 and the stopper 2. The presser 7 can move only vertically. A cam 81 is placed to gear with the groove made on the presser 7. The explanation on the shape and the arrangement of the tip 1 and the stopper 2 is omitted, because it is the same as in embodiment 1. The side of the presser 7 that faces the tip 1 is planar made of stainless steel, but this side may have a spherical shape, or have minute asperity as far as it is made of a material that is less deformable than the opaque film 3. The presser 7 weighs several tens of grams in this embodiment, but in general it should be determined according to the hardness of the opaque film 3, and the dimension of the aperture.

The rotation of the cam 81 gradually lifts the presser 7 upward. When the cam 81 reaches a predetermined angle, the cam 81 becomes free from the groove of the presser 7, and the presser 7 falls. The impact of this fall causes a plastic deformation of the opaque film 3, and then an aperture is formed at the apex of the tip 1. As the cam 81 continues to rotate, it comes again to gear with the groove of the presser 7, lifts the presser 7, lets it fall again, and repeats these steps. A simple rotation such as described here leads the presser 7 to repeat falling. By using a mechanism that translates the substrate 4 horizontally in FIG. 13, it is possible to form aperture continuously with a simple structure. Furthermore, the weight of the presser 7 or the altitude from which the presser 7 falls determines the amount of pressing. It means that the aperture size can be designed easily, and apertures of the same size can be formed in a stable manner. Additionally, the impact of the fall is given instantly so that aperture formation is possible without increasing the weight of the presser 7 when the tip 1 is lower than the stopper 2.

Even when, as shown in FIG. 12B, the substrate 4 is not planar but is contorted, it is possible to form the aperture of a predetermined size easily by applying the pressure onto the substrate 4 vertically, because the presser 7 has the size just to cover the tip 1 and the portion of the stopper 2. Additionally, the pressed area by the presser 7 is small, which means that a small mass can cause a plastic deformation of the opaque film 3 and can form aperture infallibly.

In FIG. 13, a crank 82 is placed through the hole of the presser 7, and the crank 82 is rotated by the motor 83. In this case, the presser 7 repeats the vertical motion with respect to the substrate 4 owing to the rotation of the crank 82. When the presser 7 comes to the lowest point, it presses the substrate 4, causing a plastic deformation of the opaque film 3, and forming the aperture. In this case, the presser deforms the opaque film 3 above two of the tips 1. In this way it is possible to form many apertures simultaneously. By using a mechanism that translates the substrate 4 horizontally in FIG. 13, it is possible to form many apertures quickly. The mechanism for moving the presser 7 vertically can be replaced by a conventional rack and pinion, hydraulic, air pressure, or screws. As described above, a simple structure is able to form apertures with high dimension precision, and reliability. It is made possible to form many apertures quickly.

[Embodiment 7]

Figure 14:
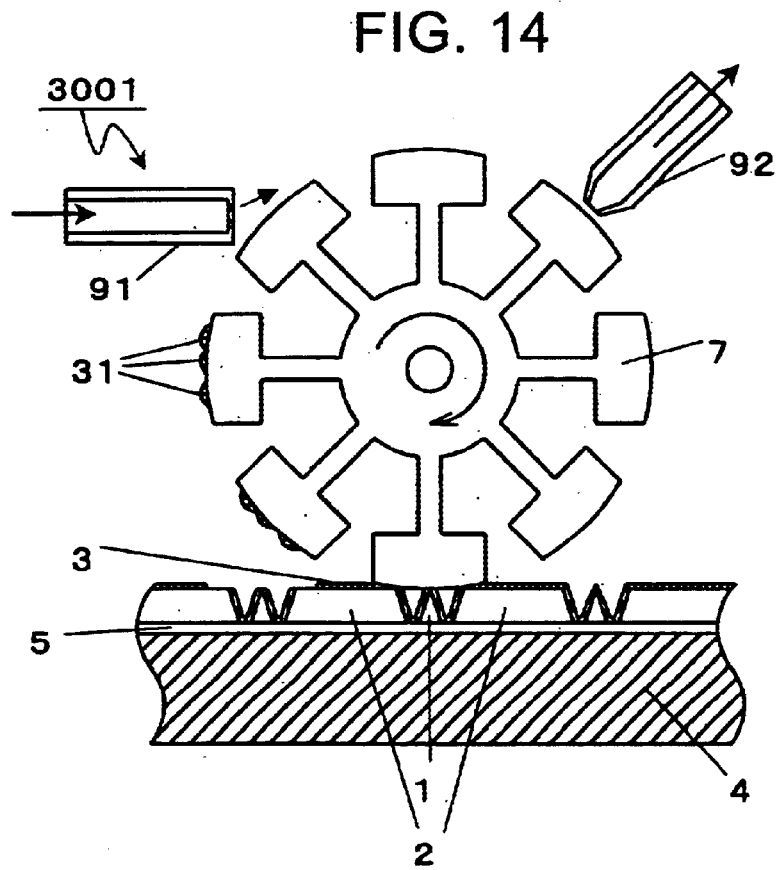
FIG. 14 depicts a diagram illustrating an apparatus for forming the aperture in an embodiment 7 of the invention.

FIG. 14 depicts the apparatus for forming optical aperture in embodiment 7. As shown in the drawing, the work 3001 comprises a transparent layer 5 formed on a substrate 4, a tip of conical or pyramidal shape 1 and a ridge-shaped stopper 2 formed on the transparent layer 5, and an opaque film 3 formed on the tip 1, the stopper 2 and the transparent layer 5. A rotating presser 7 is placed above the opaque film 3. The presser 7 is placed such that as it applies pressure on the substrate 7, it rotates to travel on the substrate 4. The explanation on the shape and the arrangement of the tip 1 and the stopper 2 is omitted, because it is the same as in embodiment 1. The presser 7 is made of cast iron, and has the shape that resembles a gear. The presser 7 may have a shape of a cast, cylinder, or sphere. The presser 7 should be made of a material that is less deformable than the opaque film 3.

As the presser 7 applies pressure on the substrate 4, the surface of the presser 7 causes a plastic deformation of the opaque film 3 above the tip 1 and the stopper 2, and an aperture is formed at the apex of the tip 1. Since the presser 7 rotates to travel on the substrate 4, it is able to form apertures continuously.

However, when the aperture is being formed by a plastic deformation of the opaque film 3, a portion of the opaque film 3, stopper 2, or the tip 1 occasionally becomes an accretion 31 attached onto the surface of the presser 7. If the presser 7 continues to rotate to travel, the accretion 31 on the presser 7 attaches the tip 1 causing a failure of aperture formation. In this embodiment, the surface of the presser 7 stays clean by a cleaner. In order to solve this problem, a discharge nozzle 91 discharges either compressed air or fluid to remove the accretion 31. A suction nozzle 92 takes in the accretion 31 with air to remove the accretion 31 from the surface of the presser 7. Therefore, the surface of the presser 7 always stays clean, and one presser 7 is able to form many apertures continuously and quickly.

There are other cleaners cleaning the surface of the presser. If the accretion is dielectric, an electrically charged electrode approaches the presser to pull the accretion by electrostatic force, removing the accretion from the presser's surface.

Figure 15:
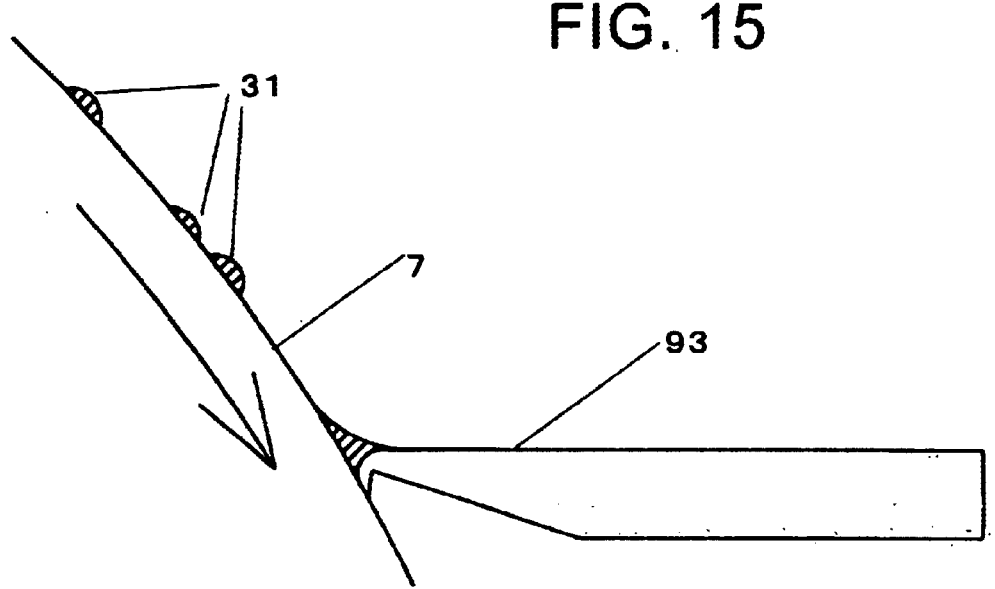
FIG. 15 depicts a diagram illustrating a method for removing the accretion in an embodiment 7 of the invention.

Furthermore, as depicted in FIG. 15, a wiper 93 which is more deformable than the presser 7 is pushed against the presser 7 so that a rotation of the presser 7 automatically leads the wiper 93 to wipe out the accretion 31. In this apparatus, the surface of the presser 7 does not deform while removes the accretion, and it becomes possible to form apertures continuously in a stable manner.

Figure 16:
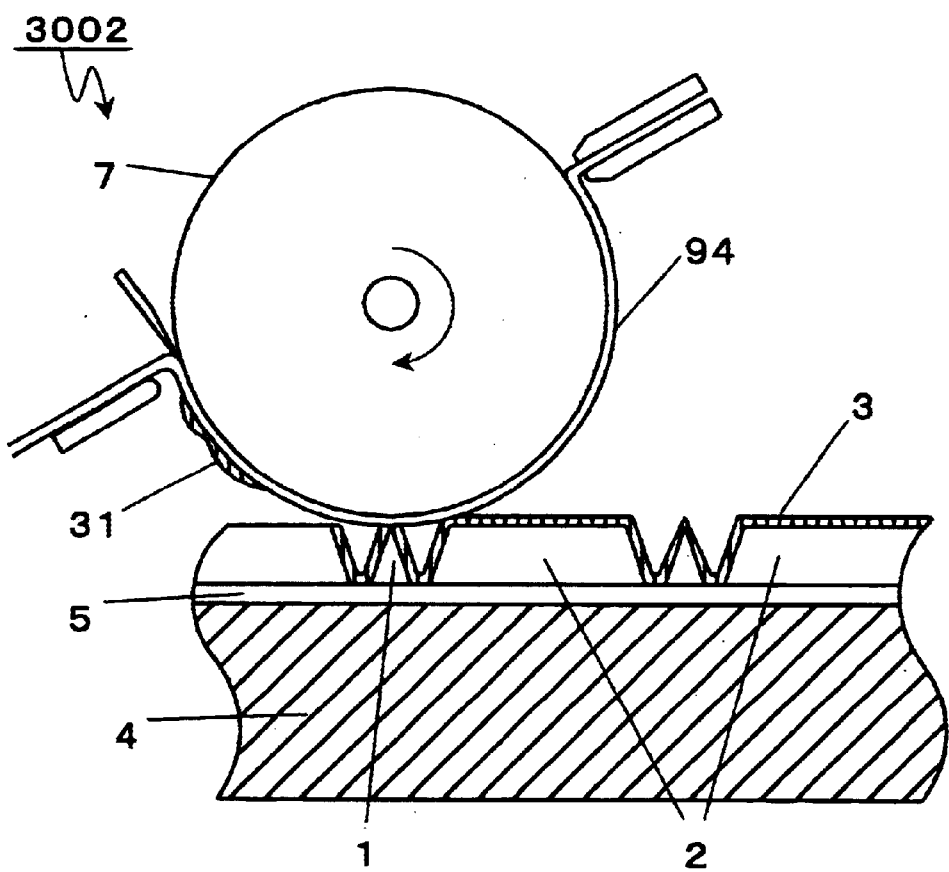
FIG. 16 depicts a diagram illustrating an apparatus for forming the aperture in an embodiment 7 of the invention.

Another apparatus can be presented as depicted in FIG. 16. A plastic protective film 94 formed on the surface of the presser 7 is removed together with the accretion after an aperture is formed. In this apparatus, the protective film 94 is always accretion-free when it is pushed for aperture formation, and it becomes possible to form apertures continuously in a stable manner.

Figure 17:
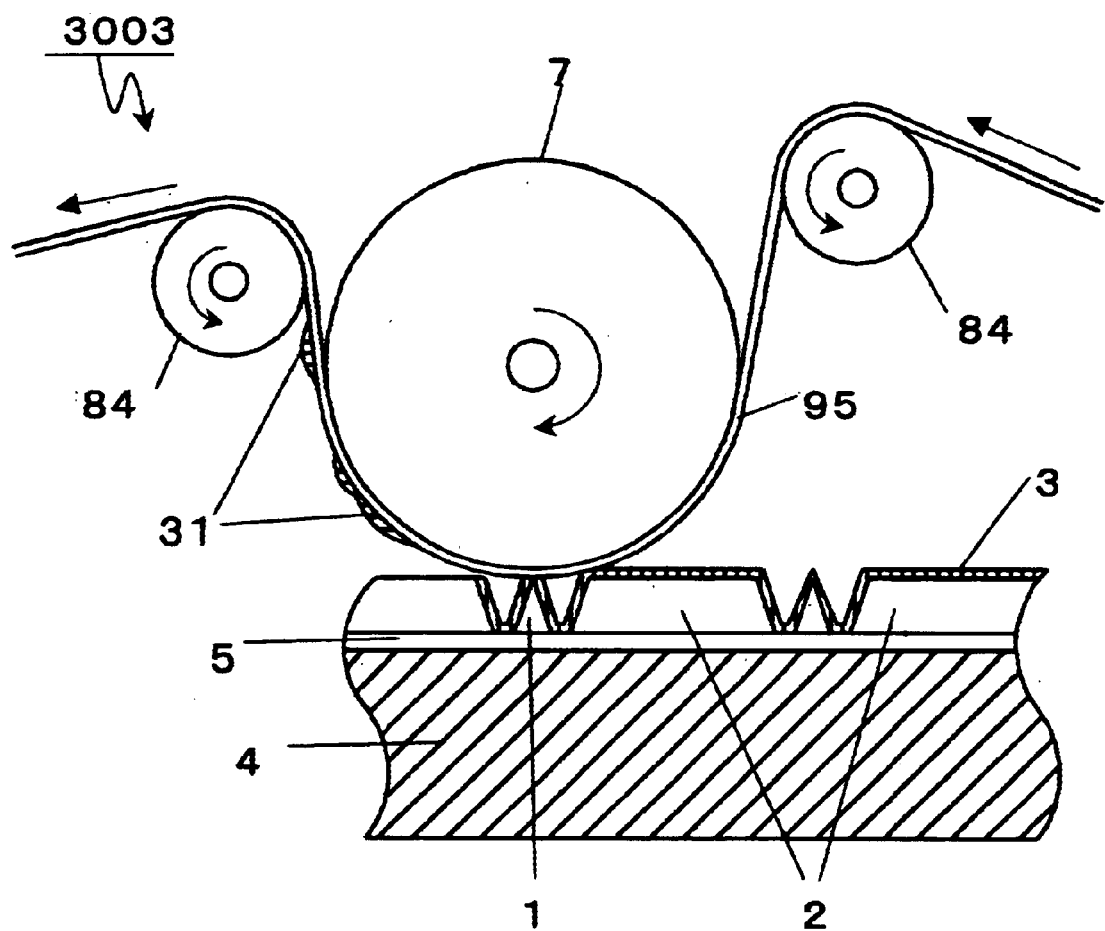
FIG. 17 depicts a diagram illustrating an apparatus for forming the aperture in an embodiment 7 of the invention.

Anther apparatus can be presented as depicted in FIG. 17. A film 95 is bound around the presser 7, and the film 95 is carried by the carrier rotor 84 in such a manner that the motion of the presser 7's surface and that of the film 95 coincide. In this apparatus, a new clean surface of the film 95 is always supplied to the pressing surface for aperture formation, and it becomes possible to form apertures continuously in a stable manner. Furthermore, the order of deformability should be, the opaque film 3, the film 95, the presser 7, the tip 1, and the stopper 2, from the least deformable to the most. By choosing the materials in this manner, the tip 1 and the stopper 2 are the least deformable. Therefore, it is easy to form apertures of a uniform dimension. Furthermore, since the surface of the presser 7 is least deformable, it is easy to form apertures continuously.

[Embodiment 8]

Figure 18A:
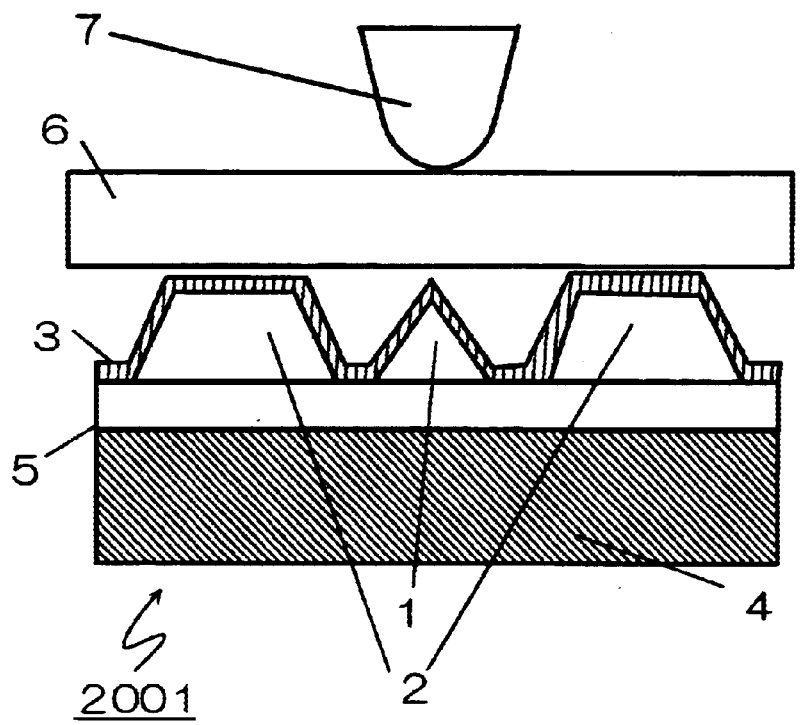
FIGS. 18A and 18B depict diagrams illustrating an apparatus for forming the aperture in an embodiment 8 of the invention.
Figure 18B:
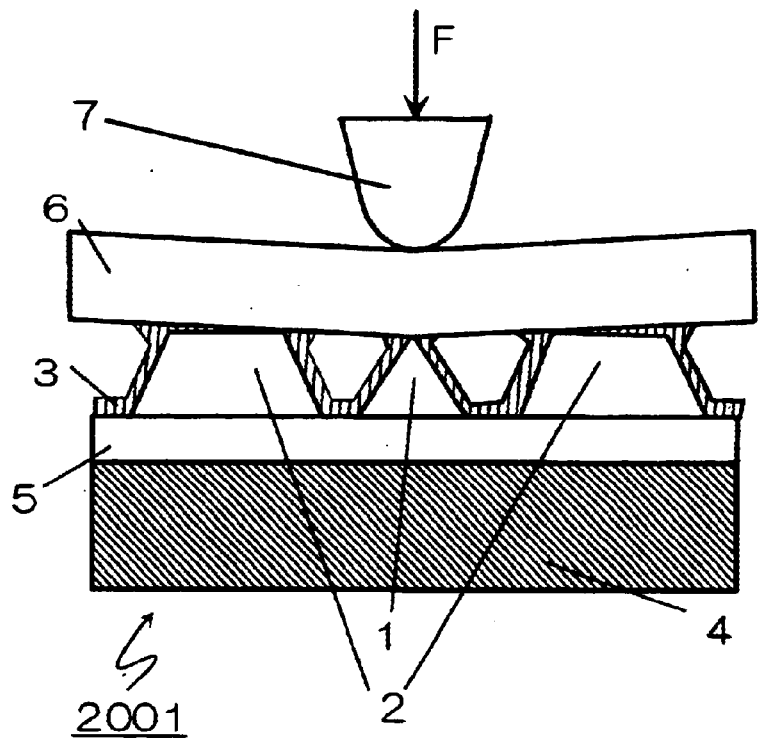
Figure 19:
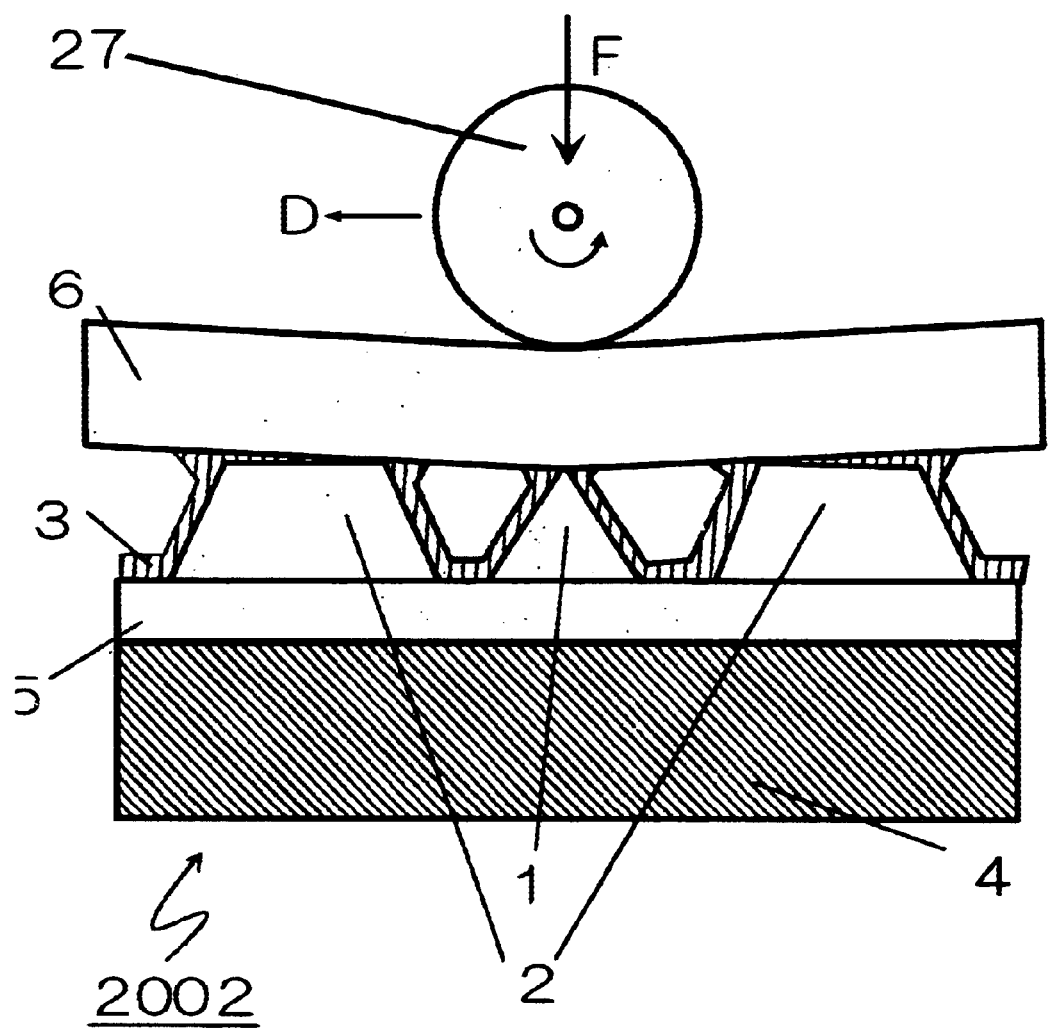
FIG. 19 depicts a diagram illustrating an apparatus for forming the aperture in an embodiment 8 of the invention.

FIGS. 18A, 18B and 19 depict the apparatus for forming optical aperture in embodiment 8. As shown in the drawing, the work 2001 comprises a transparent layer 5 formed on a substrate 4, a tip of conical or pyramidal shape 1 and a ridge-shaped stopper 2 formed on the transparent layer 5, and an opaque film 3 formed on the tip 1, the stopper 2 and the transparent layer 5. The explanation on the shape and the arrangement of the tip 1 and the stopper 2 is omitted, because it is the same as in embodiment 1.

The difference between this embodiment and the embodiment 1 is that the presser 7 has a spherical shape facing the plate 6. The presser 7 is made of stainless steel, and its tip radius of curvature is from several hundred $\mu$m to several mm. The material of the presser 7 is not necessarily stainless steel. Any material that has a higher rigidity and hardness than the plate 6 may function as the presser 7.

FIG. 18A depicts the state in which the presser 7 is not pressing the plate 6. FIG. 18B depicts the state in which the presser 7 is pressing the plate 6 with the force F. When the presser 7 presses the plate 6, the force F inflects and elastically deforms the plate 6 toward the tip 1, causing a plastic deformation of the opaque film 3, resulting in the formation of an aperture. As shown in this FIGS. 18A and 18B, if the presser 7 has a spherical shape, the plate 6 is inflected toward the tip 1. Therefore, even when the height difference ΔH between the tip 1 and the stopper 2 is big, it is possible to form an aperture on the tip 1. Furthermore, locating the apex of the tip 1 is possible by observing the position of the stopper 2 by either an optical microscope or image recognition system. Then the pressure area for the presser 7 can be determined. In this manner, the amount of the inflection of the plate 6 toward the tip 1 is kept constant, and it becomes possible to form apertures with high dimension precision. When many apertures are formed continuously and when the height difference ΔH between the tip 1 and the stopper 2 varies considerably, a large amount of the inflection ensures the formation of an aperture. When the tip of the presser 7 is sharpened more, a small force F is able to cause a large inflection of the plate 6, making it easy to form apertures.

FIG. 19 depicts an apparatus that the cylindrically shaped roller 27 is pressing the plate 6. The roller 27 is able to translate in the direction indicated as D in the figure while pressing the plate 6. It is able to form apertures with high dimension precision, and furthermore, by leading the roller 27 to press and translate on a plurality of the work 2002, it is possible to form many apertures quickly.

[Embodiment 9]

Figure 20A:
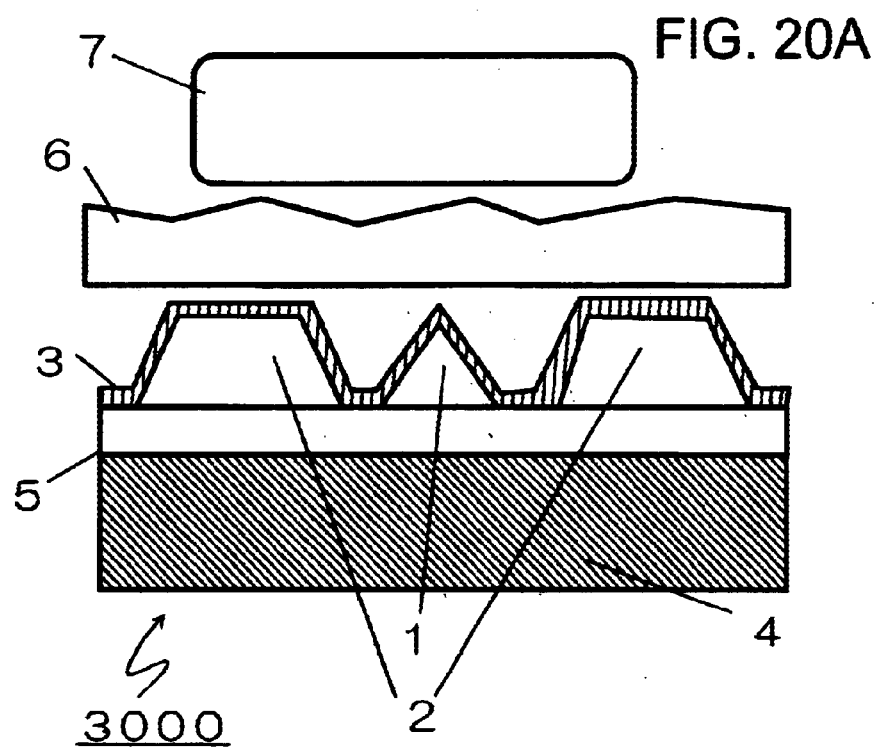
FIGS. 20A and 20B depict diagrams illustrating an apparatus for forming the aperture in an embodiment 9 of the invention.
Figure 20B:
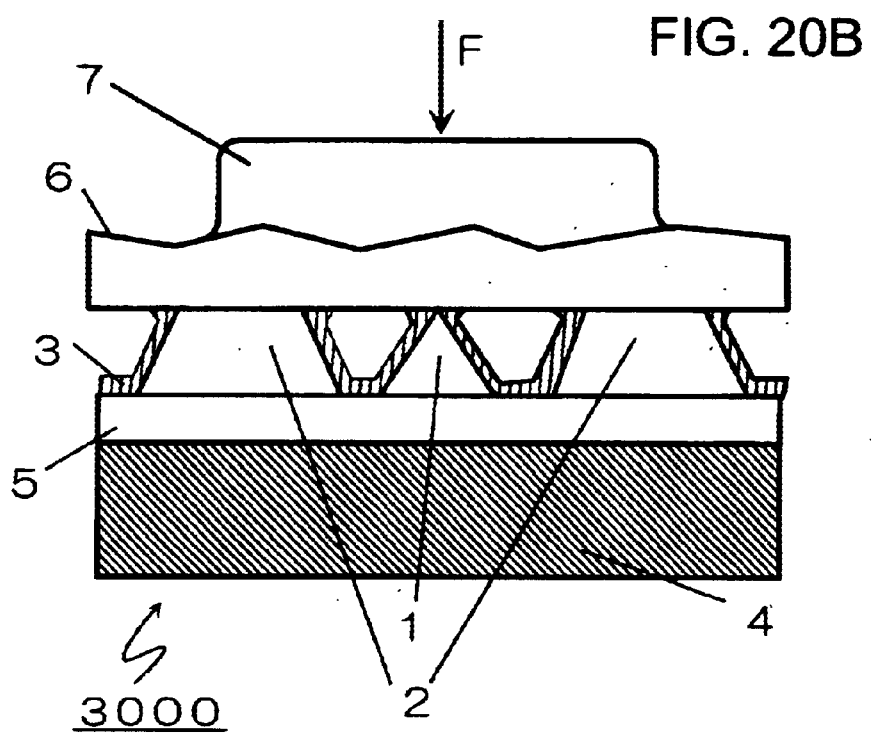

FIGS. 20B and 20b depict the apparatus for forming optical aperture in embodiment 9. As shown in the drawing, the work 3000 comprises a transparent layer 5 formed on a substrate 4, a tip of conical or pyramidal shape 1 and a ridge-shaped stopper 2 formed on the transparent layer 5, and an opaque film 3 formed on the tip 1, the stopper 2 and the transparent layer 5. The explanation on the shape and the arrangement of the tip 1 and the stopper 2 is omitted, because it is the same as in embodiment 1.

The difference of this embodiment from the embodiment 1 is that the presser 7 is made of a material softer than the plate 6. The presser 7 is a silicone rubber several mm in thickness. A presser made of a different material may function as the presser 7 as far as the material is softer than the plate 6.

FIG. 20B depicts the state in which the presser 7 is not pressing the plate 6. FIG. 20b depicts the state in which the presser 7 is pressing the plate 6 with the force F. When the presser 7 presses the plate 6 with the force F, the opaque film 3 is plastically deformed, and an aperture is formed at the apex of the tip 1. When the plate 6 has a rough surface facing the presser 7, the presser 7 deforms elastically according to the surface topology of the plate 6, and a constant pressure is applied onto the plate 6. If the presser 7 had higher rigidity than the plate 6, there would be a variation of pressure on the plate 6, the plate 6 could not press the tip 1 vertically, giving rise to a variation of the aperture size and shape. By preparing a soft presser 7 as shown in FIGS. 20A and 20B, it is possible to form apertures of a uniform dimension and shape in a stable manner. In addition, as far as the surface of the presser 7 that faces the plate 6 is made of a material softer than the plate 6, the object of this embodiment is achieved.

[Embodiment 10]

Figure 21:
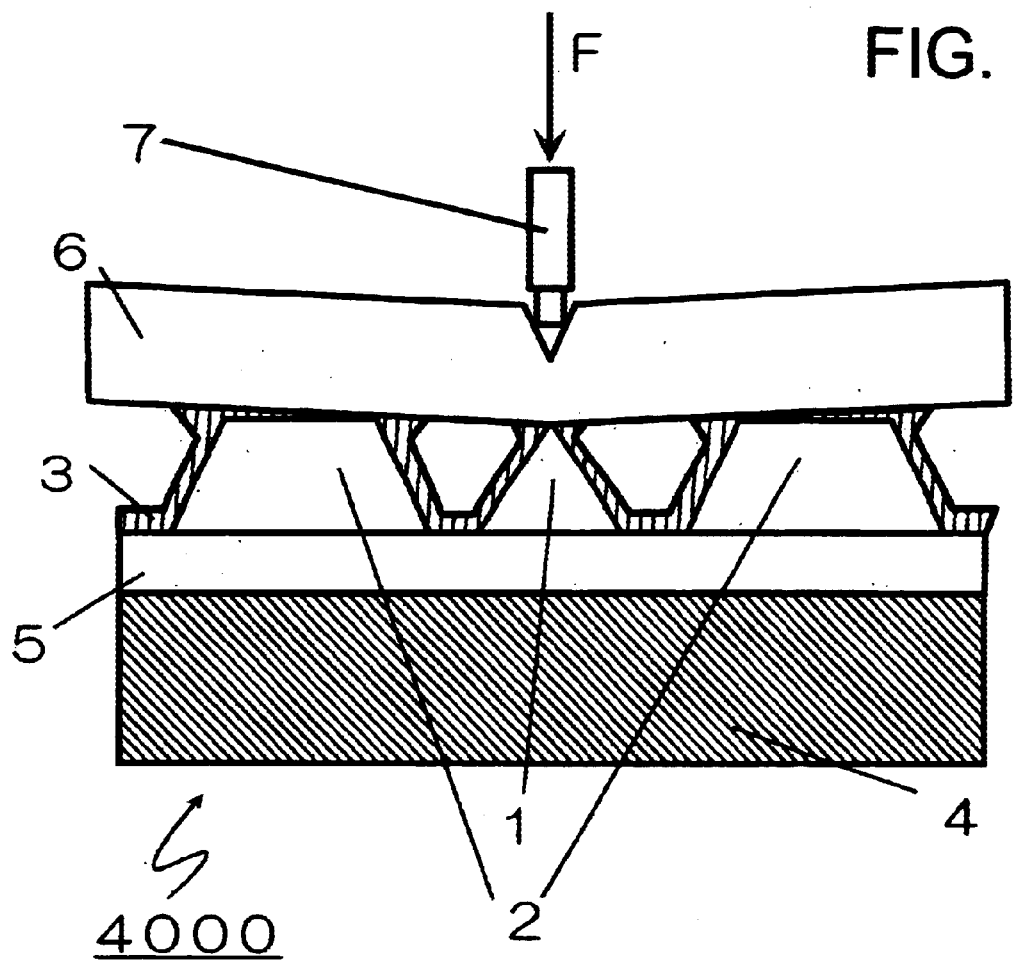
FIG. 21 depicts a diagram illustrating an apparatus for forming the aperture in an embodiment 10 of the invention.

FIG. 21 depicts the apparatus for forming optical aperture in embodiment 10. As shown in the drawing, the work 4000 comprises a transparent layer 5 formed on a substrate 4, a tip of conical or pyramidal shape 1 and a ridge-shaped stopper 2 formed on the transparent layer 5, and an opaque film 3 formed on the tip 1, the stopper 2 and the transparent layer 5. The explanation on the shape and the arrangement of the tip 1 and the stopper 2 is omitted, because it is the same as in embodiment 1.

The difference of this embodiment from the embodiment 1 is that a groove of inverted pyramid shape is formed on the plate 6, and the tip of the presser 7 has a shape that can gear with the groove on the plate 6. The presser 7 is a cylinder made of stainless steel whose tip has a radius of curvature between several hundred m and several mm. The plate 6 is a rectangular quartz glass whose edge is several mm long. On the plate 6 a groove of inverted pyramid shape is formed. This particular shape and the arrangement is one of many possible examples that a portion of the tip of the presser 7 can fit in the groove on the plate 6.

As depicted in FIG. 21, when the presser 7 presses the plate 6 with the force F, the plate 6 inflects and elastically deforms toward the tip 1, plastically deforms the opaque film 3, resulting in formation of an aperture at the apex of the tip 1. The pressure area for the presser 7 is determined by the position of the groove of the plate 6. Therefore, the amount of the inflection of the plate 6 can be controlled precisely. It is possible to form apertures of predetermined dimension and shape precisely and in a stable manner. Furthermore, the groove on the plate 6 becomes a weaker structure locally, which leads the plate 6 to be more deformable. It means that even when the tip 1 is lower than the stopper 2 it is possible to form an aperture infallibly.

Furthermore, when either of the presser or the pressing body has a concavo-convex shape, it is easy to define the load point for the presser, thus making it possible to form apertures with high dimension precision in a stable manner.
[Embodiment 11]

Figure 22:
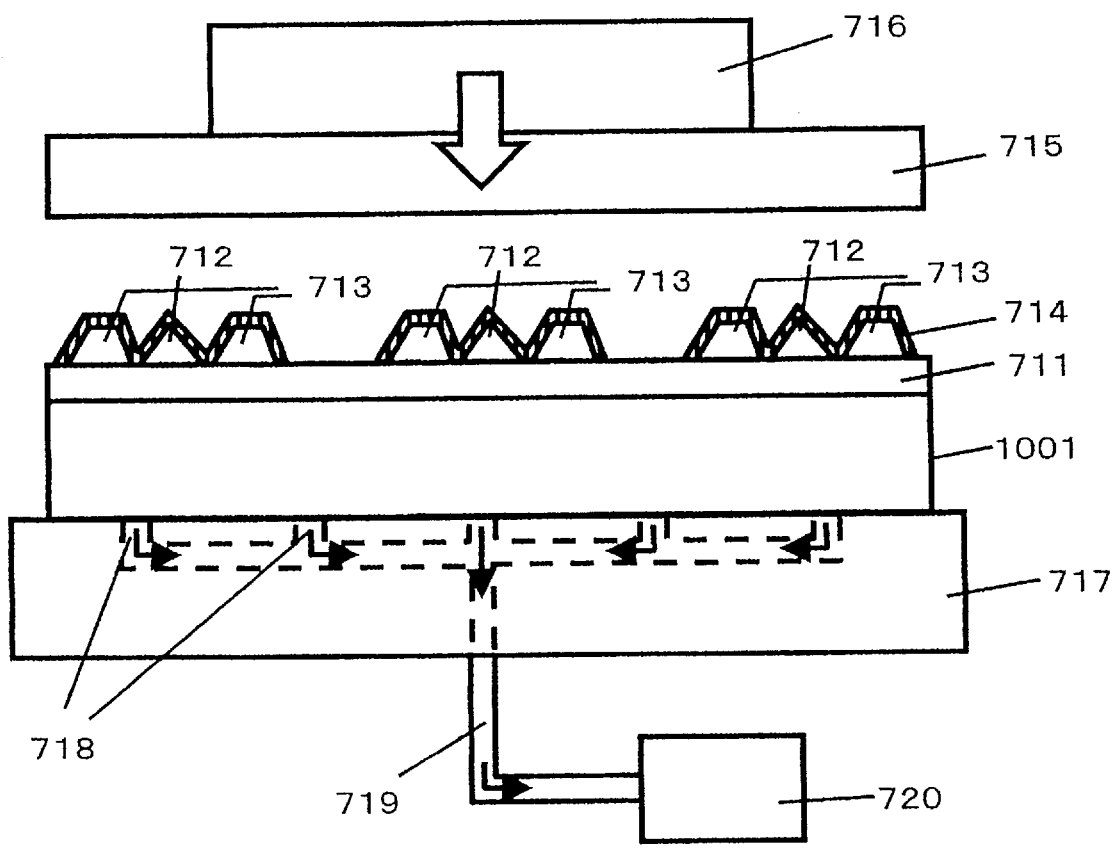
FIG. 22 depicts a diagram illustrating an apparatus for forming the aperture in an embodiment 11 of the invention.

FIG. 22 depicts the apparatus for forming optical aperture in embodiment 11. A light guiding body 711 is deposited on the work 1001. On the surface of the light guiding body 711 a sharpened tip 712 and the stopper 713 with similar height to the tip 712 are formed. An opaque film 714 is formed on the tip 712 and the stopper 713. The opaque film 714 prevents the light from leaking from the tip 712. On one work 1001 a plurality of stoppers 713 and the tips 712 are formed. The number of those stoppers 713 and the tips 712 for each work 1001 is between 10 and 1000. The shape and the arrangement of one group of the stoppers 713 and the tips 712 are similar to that in FIGS. 4 and 5. The relative height of the stoppers 713 and the tips 712 is similar to that in FIGS. 6 and 7. The aperture that detects or generates near field is formed at the apex of those tips 712. The process of the aperture formation is similar to that in the embodiment 1 (described in FIGS. 1, 2 and 3.). Here it is explained again referring to FIG. 22. The plate 715 covers the tips 712 and the stoppers 713. The presser 716 presses the plate 715 towards the tips 712. A portion of the plate 715 inflects with respect to the edge of the stoppers 713, and this portion contacts the opaque film 714 at the apex of the tip 712. A plastic deformation of the opaque film 714 forms the aperture. In this process of aperture formation, the work 1001 is placed on a flat stage 717. The stage 717 has multiple holes 718 that are connected to the tube 719 inside the stage 717. The end of the tube 719 is connected to the pump 720 placed outside the stage 717. When the pump 720 is turned on and it vacuates the tube, the work 1001 is chucked to the stage 717. With this chucking of the stage 717 by the vacuum mechanism, the tips 712 and the stoppers 713 have almost the same height in the entire surface of the work 1001.

Figure 23:
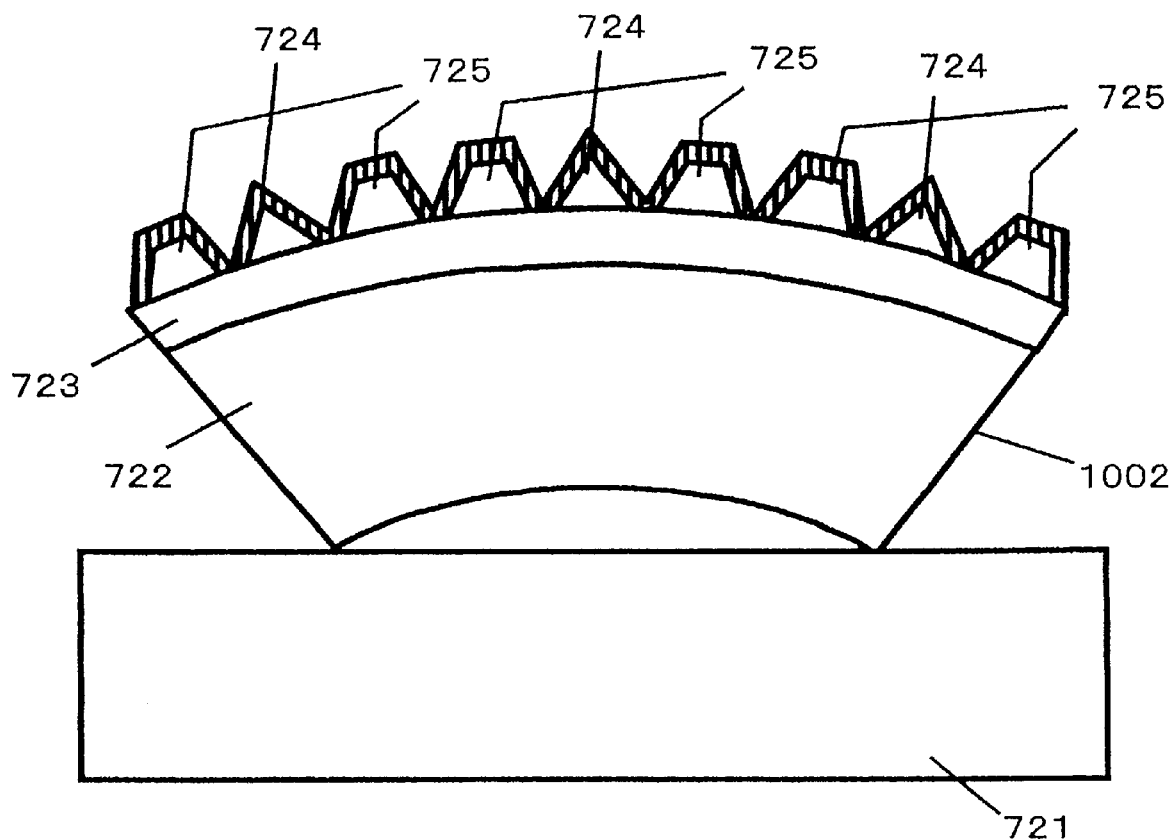
FIG. 23 depicts a diagram illustrating the state of the work 1002 when it is not vacuum chucked.

Here the problem is presented for the state when there is no vacuum chucking. FIGS. 23–26 depict the state of the work 1002 when there is no vacuum chucking. FIG. 23 depicts the work 1002 placed on the stage 721. The work 1002 comprises a substrate 722, a light guiding body 723, tips 724, and stoppers 725. When different kinds of materials are deposited on a substrate, film tension is generated, and the entire substrate curves. For example, when the substrate 722 is made of silicon, and the light guiding body 723 is made of silicon oxide, the work 1002 curves significantly as shown in FIG. 23 (in this case it points upwards). If the work 1002 is placed on the stage 721 without vacuum chucking, some portions of the work 1002 contact the stage 721, but other portions do not contact the stage 721.

Figure 24:
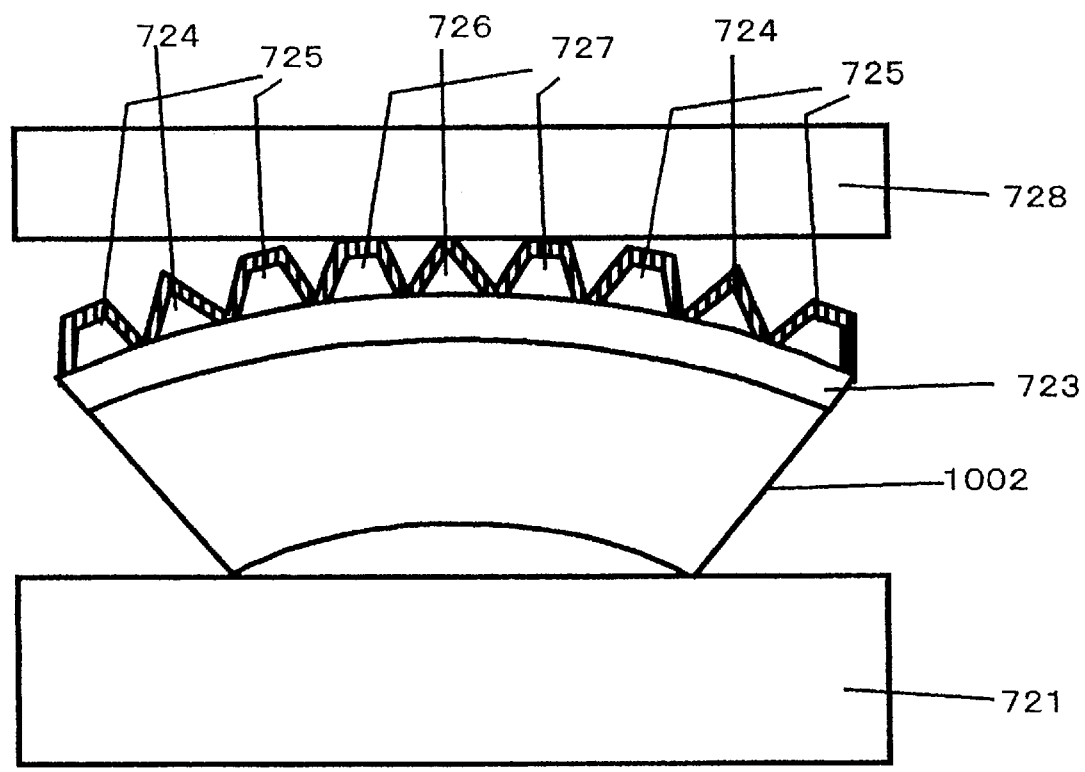
FIG. 24 depicts a diagram illustrating the state of the work 1002 with the plate 728 on the work 1002 when the work 1002 is not vacuum chucked.

FIG. 24 depicts the state in which there is no vacuum chucking. Even though the tips (724 and 726) and the stoppers (725 and 727) have the same height, because of the curve of the work 1002 their height from the stage 721 varies depending whether they are near the center of the work 1002 or they are near the edge of the work 1002. Some stoppers 727 contact the plate 728, but other stoppers 725 do not contact the plate 728.

Figure 25:
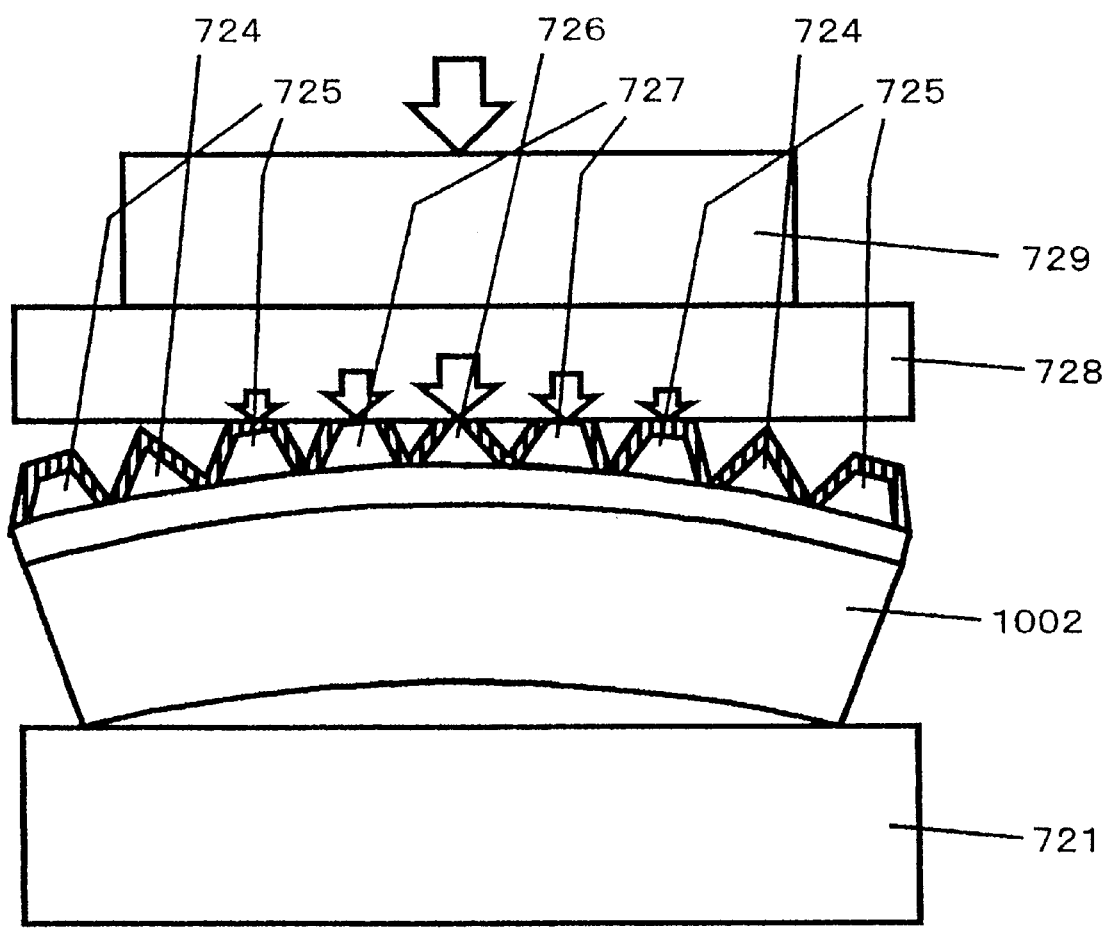
FIG. 25 depicts a diagram illustrating the state of the work 1002 on which a load is imposed by the plate 728 and the presser 729 when the work 1002 is not vacuum chucked.
Figure 26:
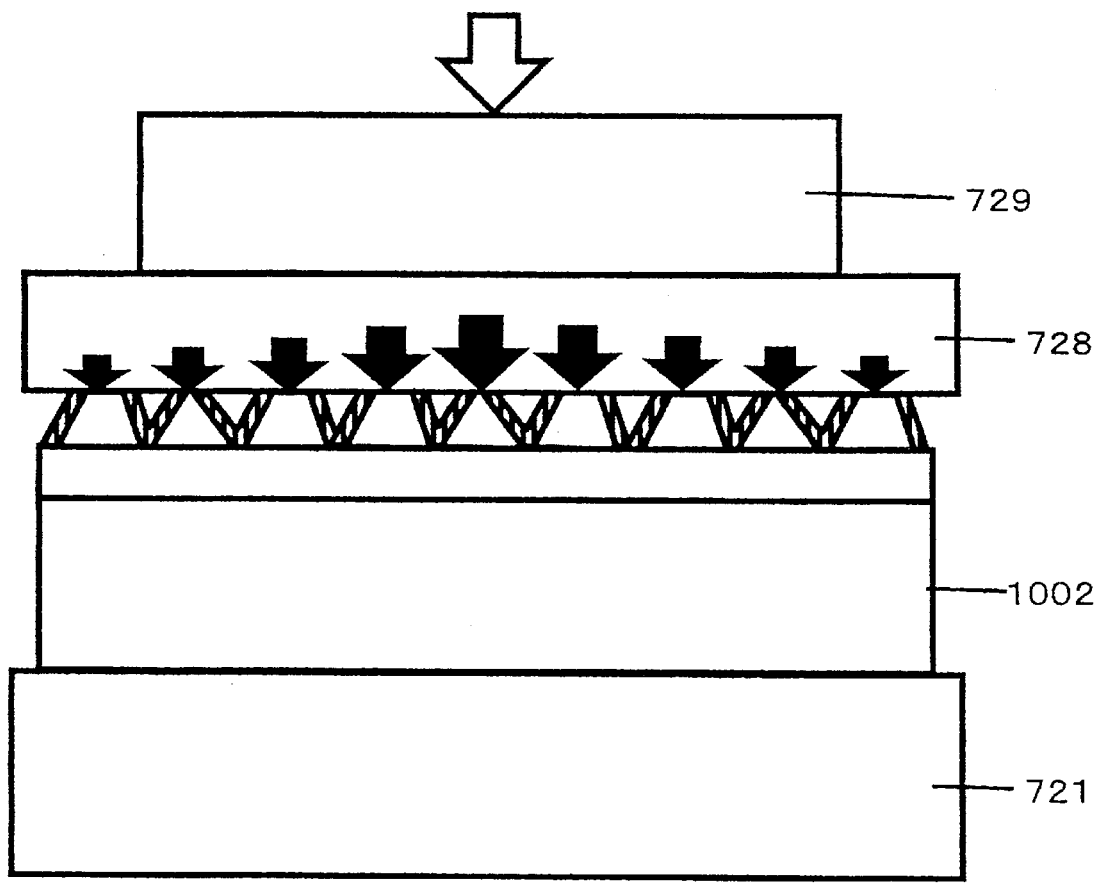
FIG. 26 depicts a diagram illustrating the state of the work 1002 on which a load is imposed by the plate 728 and the presser 729 when the work 1002 is not vacuum chucked.
Figure 27:
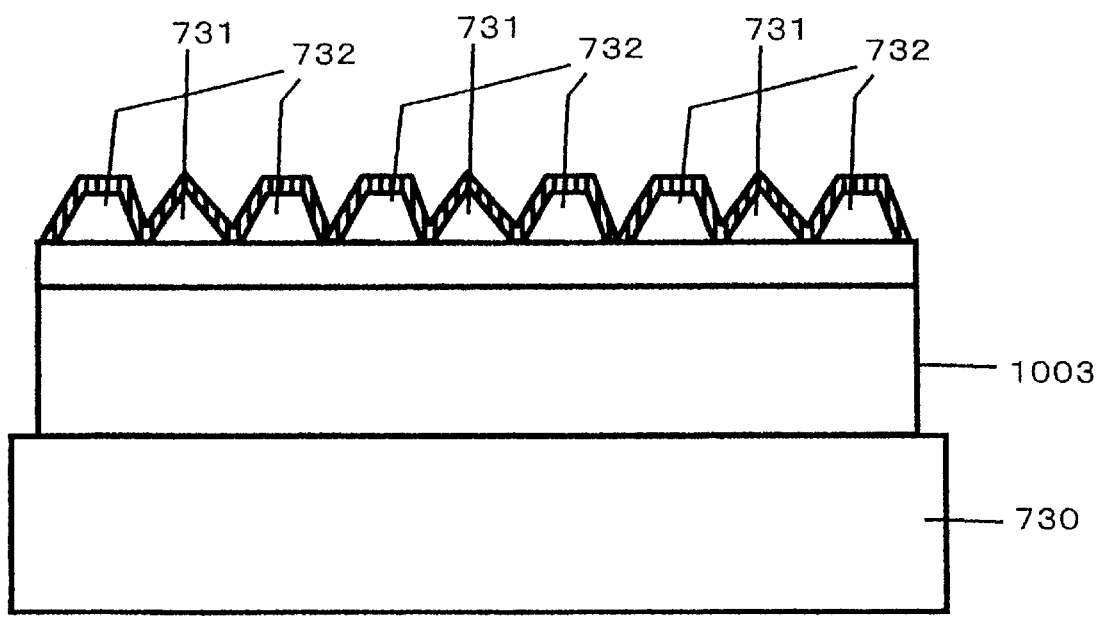
FIG. 27 depicts a diagram illustrating the curved work 1003 which is vacuum chucked and placed on the stage.
Figure 28:
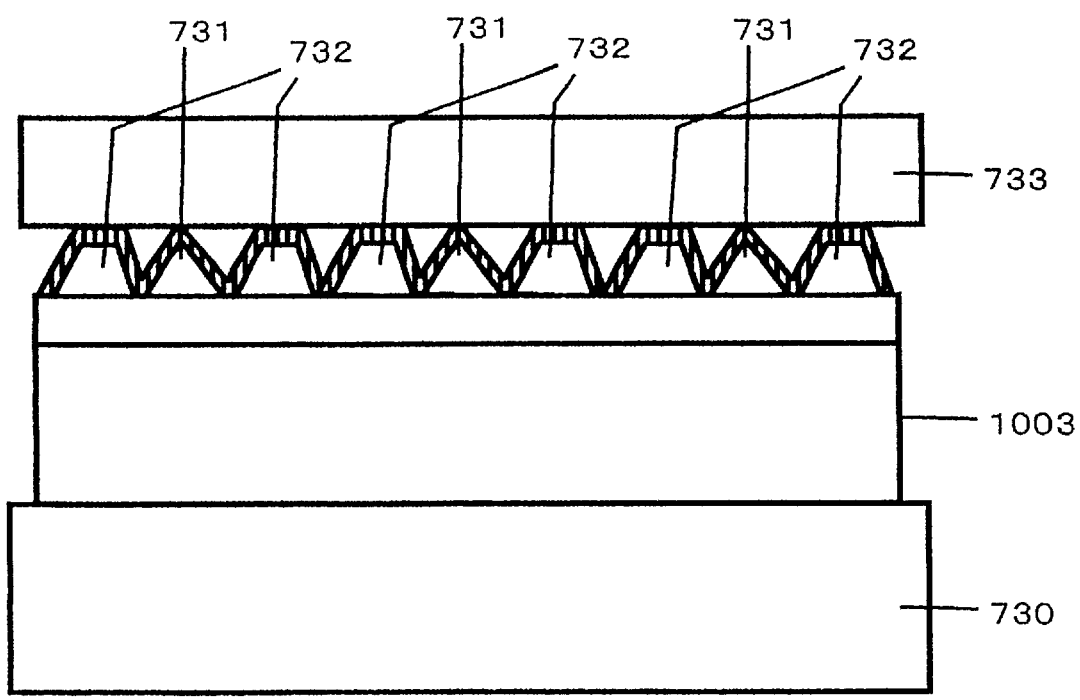
FIG. 28 depicts a diagram illustrating the work 1003 which is vacuum chucked and on which the plate 733 is placed.
Figure 29:
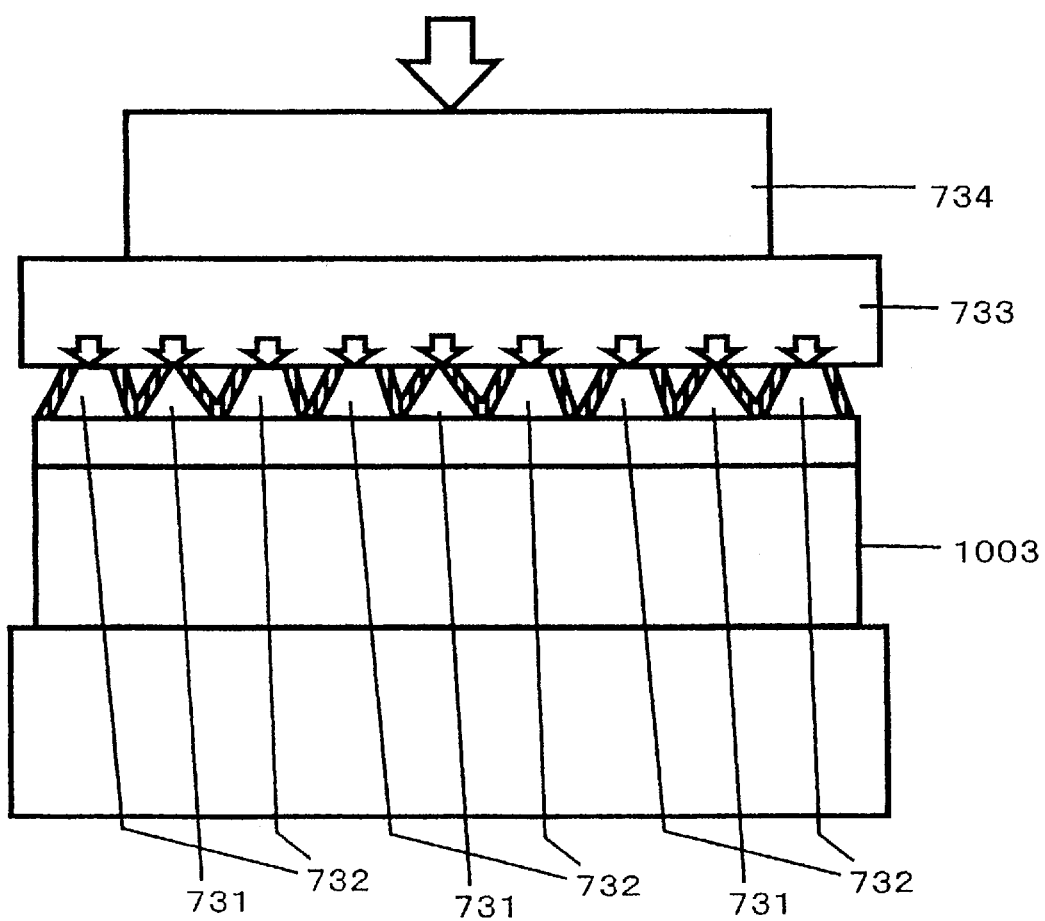
FIG. 29 depicts a diagram illustrating the work 1003 which is vacuum chucked, and on which a load is imposed by the plate 733 and the presser 734.

FIGS. 25 and 26 depict the state in which the presser 729 is pressing the work 1002 with the plate 728 when the work 1002 is not vacuum chucked. At first, the plate 728 is in contact with the stoppers 727 that are located near the center of the work 1002. The load from the presser 729 causes the formation of an aperture at the apex of the tips 726 that are located near the center of the work 1002. As the load is continuously applied, the work 1002 gradually becomes flat, and the plate 728 comes in contact with the stoppers 725 near the edge of the work 1002. The apertures near the edge of the work 1002 are formed afterwards. As the work 1002 is becoming flat, the load which is localized on the center deconcentrates, and some load starts to be applied on the peripheral areas. However, the maximum load on the center area is larger than that on the peripheral area as shown in FIG. 26. As a result, the size of the apertures near the center is larger than that of the apertures on the peripheral area, causing an unwanted variation in the aperture size. The distribution of the aperture sizes is that it is large near the center, and becomes smaller in the peripheral area. This variation in the aperture size lowers the yield of the device, and causes the increase of the production cost. FIG. 27 depicts the state in which the curved work 1003 is vacuum chucked onto the stage 730. The work 1003 is made flat. The tips 731 and the stoppers 732 have the same height from the stage 730 in the entire surface of the work 1003. This is done by placing the work 1003 on the stage 730 before vacuum chucking. The work 1003 can be placed at any place on the stage 730. Another merit of the vacuum chucking is that it is easy to place and remove the work 1003. FIG. 28 depicts the state in which the plate 733 is placed on the work 1003 that is vacuum chucked. The distance between the stage 730 and the tips 731 is the same throughout the entire surface of the work 1003. The distance between the stage 730 and the stoppers 732 is also the same throughout the entire surface of the work 1003. As a result, the stoppers 732 on both the center area and the peripheral area are in contact with the plate 733. FIG. 29 depicts the state in which load is applied by the presser 734 through the plate 733 onto the work 1003 which is vacuum chucked. As explained in FIG. 28, most stoppers 732 on the work 1003 are in contact with the plate 733. The load applied by the presser 734 onto the stoppers 732 is constant throughout the surface of the work 1003. Similarly, a constant load is applied on the tips 731 without depending on the location. As a result, apertures of the same size are formed on the entire surface of the work 1003. It is now possible to form apertures of the same size with high yield. It is also possible to form apertures of uniform size without vacuum chucking if a stage and a plate which have the same shape as the work are prepared. However, works with different curving cannot be handled in this way. When vacuum chucking is used, apertures of a uniform size can be formed even when the works have different degree of curving. Additionally, vacuum chucking is low cost in terms of installation expense and maintenance because of its simple mechanism which has a tube through a hole in the stage connected to the pump. Alternative method for fixing the work on the stage may be a method using glue or wax, but removing the work from the stage or removing the glue from the work would be difficult. Another alternative method is to use screws, but there would be additional step to make holes on the work, and the cost would be high. The method of vacuum chucking has other merits that removing the work is easy, the work is not damaged, and no cleaning is necessary.

In the explanation above, chucking is done by vacuum. Needless to say, there are other methods for chucking, for example, electrostatic force between the electrode on the work and another electrode on the stage, or, magnetic force between the magnetic film on the work and another magnetic film on the stage.

ADVANTAGE OF THE INVENTION

By controlling the height of the tip 1, stopper 2, and the force F, it is easy to form aperture 8. An actuator with high resolution is not needed. The height of the tip 1 and the stopper 2 is controlled precisely. The yield of aperture formation is improved. The work 1000 in the embodiment 1 can be fabricated using conventional photolithography. Multiple apertures can be formed on a work of a large area such as a wafer. By keeping the force F to be constant, apertures of the same size can be formed on each of the work 1000. Since it is easy to change the force F, it is possible to form apertures of different sizes for each of multiple works 1000.

Additionally, apertures are formed in a very short time, namely less than several tens of seconds for each aperture. This is because an aperture is formed by simply applying the force F. Besides, according to the embodiment 1 of the invention, any fabricating atmosphere is acceptable. Therefore, fabrication in the atmosphere is possible and fabricating states can be observed by the optical microscope immediately. In addition, fabrication in the scanning electron microscope allows the fabricating states to be observed with higher resolutions than the optical microscope as well. Furthermore, fabrication in a liquid allows the liquid to serve as a damper and thus fabricating conditions with improved controllability can be obtained.

Additionally, multiple apertures having a uniform aperture diameter can be produced at one time by applying the pushing force to the sample fabricated with a plurality of the works 1000 in the block. In the case of fabrication in the block, the fabrication time per aperture becomes extremely as short as a few hundreds milliseconds or under, depending on the number of the works 1000 per wafer.

Additionally, since the amount of the deformation of the opaque film 3 is determined by the weight of the presser 7, the height from which the weight falls, or the force of the pressing, it is possible to form apertures of the same size easily in a stable manner. When the presser 7 repeats vertical motion, a simple structure can form apertures with high dimension precision, in a short time infallibly. Mass production of the apertures is also possible. The production cost becomes very low. When the presser 7 falls to cause an impact to form an aperture, the impact is applied instantaneously. Therefore, even when the tip 1 is lower than the stopper 2, an aperture can be formed without increasing the weight of the presser 7. When the presser 7 has a size that covers the tip 1 and a portion of the stopper 2, load is applied vertically on the substrate 4 automatically even when the substrate 4 is distorted. It is easy to form apertures of the same size on the tip 1. Since the pressure area for the presser 7 is small, a small mass can cause plastic deformation of the opaque film 3, and apertures can be formed infallibly.

Additionally, when the cleaner removes the accretion from the surface of the presser 7, one presser 7 can continuously be used to form apertures in a stable manner, resulting in lowering the production cost. When the surface of the presser 7 is protected by a protective film that is removed together with the accretion after aperture formation, and when the opaque film 3, the protective film, the presser 7, tip 1, and the stopper 2 are in this order from the least deformable to the most deformable, it is easy to form apertures of a uniform size continuously.

Additionally, when the tip of the presser 7 has a spherically convex shape facing the plate 6, it is easy to increase the amount of inflection, and an aperture can be formed on the tip 1 even when the height of the tip 1 and that of the stopper 2 differ much. By controlling the pressure point of the presser 7 it is possible to keep the amount of the deformation of the plate 6 constant, thus to form apertures with high dimension precision. When multiple apertures are formed continuously but the height difference ΔH between the tip 1 and the stopper 2 has a large variation, apertures can be formed infallibly because the amount of inflection is kept large. When the tip of the presser 7 is sharpened even more, a small force F can cause a large inflection of the plate 6, thus making it easy to form apertures. When a presser roller 27 of a cylindrical shape presses the plate 6, the roller 27 can press the plate 6 with the force F while traveling horizontally, thus it is possible to form many apertures quickly with high dimension precision in fallibly.

Additionally, when the presser 7 is softer than the plate 6, a constant force can be applied even when the surface of the plate 6 is not flat, thus making it possible to form apertures of the same size and shape in a stable manner.

Additionally, when the plate 6 has a groove of inverted pyramidal shape, and the presser 7 has a tip which gears with the groove, it is easy to determine the pressure point, thus making it possible to form apertures with high dimension precision. Furthermore, the portion of the plate 6 where the groove is formed is more deformable than the other portions of the plate 6. Even when the tip 1 is lower than the stopper 2, aperture can be formed infallibly.

Additionally, by fixing the work by vacuum chucking, it is possible to form apertures of the same size and shape on the work even when the work curves. When each work has different degrees of curve, same sized apertures can be formed. Therefore, the yield of the aperture formation improves, thus lowering the cost. The apparatus and its maintenance is low cost. Other advantages are, it is easy to uninstall the vacuum chucking mechanism, the work is not damaged, or no cleaning is needed.

What is claimed is:

1. An apparatus for forming an optical aperture, the apparatus comprising: an object having a tip with a pointed end, a plurality of stoppers disposed adjacent the tip, and an opaque film disposed on the tip and the stoppers; and a pressing body for pressing the pointed end of the tip, at least a part of each of the stoppers, and at least a part of the opaque film to form an optical aperture at the pointed end of the tip.

2. An apparatus according to claim 1; wherein the tip of the object is generally conical-shaped.

3. An apparatus according to claim 1; wherein the tip of the object is generally pyramidal-shaped.

4. An apparatus according to claim 1; wherein the pressing body comprises a plate member and a pressing member for pressing the plate member against the pointed end of the tip, the part of each of the stoppers, and the part of the opaque film.

5. An apparatus according to claim 1; wherein the tip and the stoppers of the object have substantially the same height.

6. An apparatus according to claim 1; wherein the stoppers define a ridge-shaped structure.

7. An apparatus according to claim 1; wherein the stoppers are disposed around the tip.

8. An apparatus for forming an optical aperture, the apparatus comprising: an object having a tip with a pointed end, a plurality of stoppers disposed adjacent the tip, and an opaque film disposed on the tip and the stoppers; at least one pressing body for pressing the pointed end of the tip, at least a part of each of the stoppers, and a least a part of the opaque film to form an optical aperture at the pointed end of the tip; and at least one loader for applying a loading force on the pressing body to press the pointed end of the tip, the part of each of the stoppers, and the part of the opaque film.

9. An apparatus according to claim 2; wherein the at least one loader comprises a plurality of loaders each for applying a loading force on a preselected target point on a surface of the pressing body to press the pointed end of the tip, the part of each of the stoppers, and the part of the opaque film.

10. An apparatus according to claim 2; wherein the at least one pressing body comprises a plurality of the pressing bodies each for pressing the pointed end of the tip, the part of each of the stoppers, and the part of the opaque film to form the optical aperture at the pointed end of the tip.

11. An apparatus according to claim 8; wherein the tip of the object is generally conical-shaped.

12. An apparatus according to claim 8; wherein the tip of the object is generally pyramidal-shaped.

13. An apparatus according to claim 8; wherein the pressing body comprises a plate member and a pressing member for pressing the plate member against the pointed end of the tip, the part of each of the stoppers, and the part of the opaque film.

14. An apparatus according to claim 8; wherein the tip and the stoppers of the object have substantially the same height.

15. An apparatus according to claim 8; wherein the stoppers define a ridge-shaped structure.

16. An apparatus according to claim 8; wherein the stoppers are disposed around the tip.

17. An apparatus for forming an optical aperture, the apparatus comprising: an object comprised of a substrate, a transparent layer disposed on the substrate, a tip disposed on the transparent layer and having a pointed end, a plurality of stoppers disposed on the transparent layer, and an opaque film disposed on the tip and the stoppers; and a pressing body for pressing the pointed end of the tip, at least a part of each of the stoppers, and at least a part of the opaque film to form an optical aperture at the pointed end of the tip.

18. An apparatus according to claim 17; wherein the tip of the object is generally conical-shaped.

19. An apparatus according to claim 17; wherein the tip of the object is generally pyramidal-shaped.

20. An apparatus according to claim 17; wherein the tip of the object is generally pyramidal-shaped.

21. An apparatus according to claim 17; wherein the tip and the stoppers of the object have substantially the same height.

22. An apparatus according to claim 17; wherein the stoppers define a ridge-shaped structure.

23. An apparatus according to claim 17; wherein the stoppers are disposed around the tip.

24. An apparatus according to claim 17; wherein the substrate is made of a transparent material.

25. An apparatus according to claim 17; wherein the pressing body comprises a plate member and a pressing member for pressing the plate member against the pointed end of the tip, the part of each of the stoppers, and the part of the opaque film.

26. An apparatus for forming an optical aperture, the apparatus comprising: a substrate; a probe tip supported by the substrate; a pressing device for pressing against an end of the probe tip to form an optical aperture at the end of the probe tip; and at least one stopping member supported by the substrate and engageable against the pressing device for controlling a pressing force applied by the pressing device on the end of the probe tip.

27. An apparatus according to claim 26; wherein the probe tip and the stopping member have substantially the same height so that the pressing device applies a pressing force on the stopping member and the end of the probe tip to form the optical aperture at the end of the probe tip.

28. An apparatus according to claim 26; wherein the at least one stopping member comprises a plurality of stopping members.

29. An apparatus according to claim 26; further comprising an opaque film disposed on the probe tip and on the stopping member.

30. An apparatus according to claim 26; wherein the pressing device comprises a plate member and a presser for applying a load on the plate member to press the stopping member and the end of the probe tip to form the optical aperture at the end of the probe tip.

31. An apparatus according to claim 26; wherein the probe tip is generally conical-shaped.

32. An apparatus according to claim 26; wherein the probe tip is generally pyramidal-shaped.

33. An apparatus according to claim 26; wherein the probe tip and the stopping member have substantially the same height.

34. An apparatus according to claim 26; wherein the at least one stopping member comprises a plurality of stopping members.

35. An apparatus according to claim 26; wherein the stopping members are disposed around the tip.

* * * * *